US008826274B2

(12) United States Patent
Moriki et al.

(10) Patent No.: US 8,826,274 B2
(45) Date of Patent: Sep. 2, 2014

(54) VIRTUAL MACHINE SYSTEM, NETWORKING DEVICE AND MONITORING METHOD OF VIRTUAL MACHINE SYSTEM

(75) Inventors: Toshiomi Moriki, Kokubunji (JP); Yoshiko Yasuda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 691 days.

(21) Appl. No.: 13/040,316

(22) Filed: Mar. 4, 2011

(65) Prior Publication Data

US 2011/0307889 A1 Dec. 15, 2011

(30) Foreign Application Priority Data

Jun. 11, 2010 (JP) .................................. 2010-133708

(51) Int. Cl.
G06F 9/455 (2006.01)
G06F 9/46 (2006.01)
G06F 9/50 (2006.01)

(52) U.S. Cl.
CPC .................................. G06F 9/5005 (2013.01)
USPC .............................................. 718/1; 718/102

(58) Field of Classification Search
CPC .................................................... G06F 9/5005
USPC ......................................................... 718/102
See application file for complete search history.

(56) References Cited

U.S. PATENT DOCUMENTS

| 6,785,277 | B1 * | 8/2004 | Sundling et al. ............... 370/392 |
| 7,480,719 | B2 * | 1/2009 | Inoue ............................. 709/226 |
| 2005/0132362 | A1 * | 6/2005 | Knauerhase et al. ............. 718/1 |
| 2009/0024994 | A1 | 1/2009 | Kannan et al. |
| 2009/0327392 | A1 * | 12/2009 | Tripathi et al. ................ 709/201 |
| 2012/0304175 | A1 * | 11/2012 | Damola et al. .................... 718/1 |

FOREIGN PATENT DOCUMENTS

| JP | 2001-195285 A | 7/2001 |
| JP | 2002-374301 A | 12/2002 |
| JP | 2006-65619 A | 3/2006 |

* cited by examiner

Primary Examiner — Meng An
Assistant Examiner — Blake Kumabe
(74) Attorney, Agent, or Firm — Mattingly & Malur, PC

(57) ABSTRACT

A method of monitoring a virtual computer system including a network device coupled to a client computer, sever computers each coupled to the network device, and a performance degradation source locator apparatus coupled to the network device and the server computer, obtaining, by the performance degradation source locator apparatus, performance information on physical computer resources and performance information on virtual computer resources of extracted virtual machines and server computers and the virtual machine and the server computer in which the latency has increased to locate a part in which the latency has increased.

18 Claims, 13 Drawing Sheets

FIG. 4

| DESTINATION IP ADDRESS | APPLICATION SERVER NO. | VM NO. |
|---|---|---|
| 10.1.2.3 | APServ #1 | VM #1 |
| 10.1.2.4 | APServ #1 | VM #2 |
| 10.2.1.1 | APServ #2 | VM #1 |
| .. | .. | .. |

501 / 502 / 503
511 / 512 / 513

301 COMMUNICATION FLOW INFORMATION

| APPLICATION SERVER NO. | VM NO. | STORAGE APPARATUS NO. | LU NO. |
|---|---|---|---|
| APServ #1 | VM #1 | RAID #1 | LU #101 |
| APServ #1 | VM #2 | RAID #1 | LU #102 |
| APServ #2 | VM #1 | RAID #1 | LU #201 |
| | | | |

302 SHARED RESOURCE INFORMATION

FIG. 5

VIRTUAL MACHINE SYSTEM, NETWORKING DEVICE AND MONITORING METHOD OF VIRTUAL MACHINE SYSTEM

CLAIM OF PRIORITY

The present application claims priority from Japanese patent application JP2010-133708 filed on Jun. 11, 2010, the content of which is hereby incorporated by reference into this application.

BACKGROUND OF THE INVENTION

This invention relates to a virtual computer system that provides services to be executed by a plurality of virtual machines via a network and a technique to locate a part where performance has degraded in the virtual computer system and in particular, relates to improvement of a virtual computer system that provides cloud computing.

Economic globalization and consequent fiercer competition require continuous innovation in businesses. As to IT systems to support business activities, it is not uncommon that system constructions are requested within such an extremely short period as a month or two for new services to be released, so that companies take on heavy burden of costs to construct and maintain their own (in-house) IT systems. To cope with the problem, cloud computing, which is a service that a company outsources its IT system to a data center provider to use computer resources only for a required period, has come up as a service utilizing a wide area network (WAN) which is remarkable in recent years in broadening the bandwidth.

Service modes provided by the cloud computing are generally categorized into three cloud services depending on the flexibility of IT resources to be provided: IaaS (Infrastructure as a Service), PaaS (Platform as a Service), and SaaS (Software as a Service). IaaS is a cloud service for offering an infrastructure such as electric power, an installation site, and a network backbone. PaaS is a cloud service that a data center provider prepares hardware for IT equipment, virtual machine monitors (VMMs), virtual machines, and operating systems (OSs) in addition to the infrastructure to offer virtual machines to a company. SaaS is a service that a data center provider prepares business applications in addition to the virtual machines for the client company to rent them by hour.

Globally advanced cloud vendors offer services corresponding to PaaS or SaaS. Such vendors' services are commonly called public cloud and provided via the Internet. Public cloud allows a low-cost and quick preparation for start of services, but suffers from temporary congestion or disconnection in the Internet, so that it is difficult to provide stable services on an end-to-end (a terminal of a client to a business application) basis. On fears to the reliability, public cloud is not so popular for core business IT systems.

In contrast, WAN service utilizing a network service such as dedicated line provided by a carrier, IP-VPN, or wide area Ethernet instead of the Internet provides higher reliability and higher-quality communication compared with the Internet and suitable for core business IT systems. As a cloud service using the WAN, a service equivalent to PaaS is known that rents server resources in units of virtual machines (for example, Hitachi's Harmonious Cloud). PaaS using WAN advantageously establishes high reliability unlike the public cloud, so that PaaS can provide stable cloud services.

For a cloud service with the WAN and the PaaS combined (hereinafter, the specific cloud service), a data center provider provides communication infrastructures (WAN and LAN), server hardware, and virtual machines (or virtual servers) in a one stop. A client company is required to prepare only business applications to work in the virtual machines to use the service. In the specific cloud service, the client company accesses virtual machines in a data center from a client at its site via the WAN provided by a carrier tied-up with the data center provider.

In the specific cloud service, the WAN for providing the service, the LAN equipment in the data center, virtual machine monitors, and physical computers are shared by a plurality of companies. For this reason, if any problem occurs such as performance degradation in some business application used by some company, the part which has developed the performance degradation should be located promptly. The data center provider informs the section in charge of operation management of the part with the problem to eliminate or fix the performance degradation in the services. For example, if the source of the performance degradation in the services is the WAN, the provider needs to notify the tied-up carrier of the problem, or if the LAN equipment or the VMM in the data center is the source of the performance degradation, it needs to notify the PaaS operation management section in the data center, and if the business application running on the virtual machines itself is the source of the performance degradation, the data center provider needs to notify the client company which developed the business application.

To locate the source of performance degradation in a computer system, techniques in the following patent documents are known.

JP2002-374301A, in which a network is formed of a plurality of carriers, relates to monitoring the quality of communication at a relay node between carriers to notify the user of it. A fault in a WAN can be detected.

JP2006-65619A discloses a technique that sorts the source of a fault into a network and application servers. A fault in a LAN in a data center or a fault in a WAN can be detected.

US2009/024994A discloses a technique that obtains performance information on a physical server with a VMM configuring virtual computers and obtains performance information on virtual machines with an agent operated in the virtual machines to locate the part where performance has degraded in the virtual computers.

JP2001-195285A discloses a technique in a computer system including a server and LAN equipment that collects performance information on application programs running on the server and network traffic and performs multivariate analysis on the collected information to presume the part which has developed a fault based on a predetermined correlationship.

SUMMARY OF THE INVENTION

The foregoing JP2002-374301A enables detection of a trouble such as an increase in communication latency originated in a WAN, but cannot detect a trouble in LAN equipment or a server in a data center or in the OS or a business application in the server.

The foregoing JP2006-65619A enables detection of a trouble such as processing performance degradation on services originated in LAN equipment in a data center, but cannot locate the part which has developed a fault in a server, such as between a VMM and software in a virtual machine.

The foregoing US2009/024994A obtains performance monitoring information from a VMM and guest OSs on virtual machines with an agent to locate the part which has developed a fault in a server, but cannot locate the source of the fault in a WAN or a LAN outside the server.

The foregoing JP2001-195285A can, in principle, locate the part which has developed a fault in the range from a WAN to the inside of a server in a desired size of section by dividing performance monitoring information obtained from a computer system including servers and LAN equipment. However, for a provider of a data center to use the technique of JP2001-195285A, it is required to preliminarily collect massive performance information generated from individual equipment such as LAN equipment and servers for multivariate analysis. Consequently, it disadvantageously takes significant time to locate the part which has developed a fault, so that a fault cannot be detected promptly.

For the combination of JP2002-374301A, JP2006-65619A, and US2009/024994A to locate the part which has developed a fault in the range from a WAN to the inside of a server, performance information must be obtained from all equipment configuring the cloud computing and analyzed, like JP2001-195285A. Consequently, it disadvantageously takes significant time to locate the part which has developed a fault, so that a fault cannot be detected promptly.

In particular, for PaaS using a WAN like the above-described cloud computing, the provider of a data center should promptly notify the carrier if the WAN has developed a fault, or notify the client company if a business application has developed an error. If a fault has occurred in LAN equipment, a physical server, a VMM, or a virtual machine, the provider of the data center should promptly notify the person in charge of equipment operational administrator for restoration. In this way, to provide higher reliability compared with public cloud, PaaS using a WAN is required to promptly locate the part which has developed a fault and to promptly issue a notice depending on the part which has developed a fault to provide stable services.

This invention has been achieved in view of the above-described problems and an object of this invention is to provide a highly reliable cloud computing services by promptly detecting an increase in processing latency in any of a WAN configuring the cloud computing, LAN equipment in a data center, a VMM in a server, and a virtual machine on a VMM and by promptly locating of the source of the increase in latency.

A representative aspect of this invention is as follows.

A virtual computer system comprising: a network device coupled to a client computer; sever computers each coupled to the network device to provide services to the client computer; and a performance degradation source locator apparatus coupled to the network device and the server computers, wherein each of the server computers comprises: a processor for computing; a storage unit for storing information; a network interface coupled to the network device; a virtualization module for virtualizing physical resources of the server computer; and a plurality of virtual machines allowing operating systems and applications for providing the services to run on the virtualized physical resources, wherein the network device comprises a latency monitoring module that transfers a processing request from the client computer to one of the virtual machines, receives a processing response to the processing request from the virtual machine and transfers the processing response to the client computer, monitors latency from the transfer of the processing request to the transfer of the processing response to the processing request on communications satisfying monitoring conditions set by the performance degradation source locator apparatus, and sends the performance degradation source locator apparatus a delay notice indicating that the latency has increased if the latency has exceeded a predetermined threshold value, and wherein the performance degradation source locator apparatus comprises: communication flow information for setting association relations among the monitoring conditions on communications to be monitored, the server computers, and the virtual machines, the monitoring conditions on communications to be monitored, the server computers, and the virtual machines being a part of information to be transmitted and received by the network device; shared resource information for determining computer resources shared by the virtual machines, the computer resources being computer resources of the server computers and computer resources coupled to the server computers; a delay locator module for locating a virtual machine and a server computer in which the latency has increased by referring to the communication flow information upon receipt of the delay notice from the network device; an information collection range determination module for extracting other virtual machines and server computers sharing computer resources with the virtual machine in which the latency has increased with reference to the shared resource information; and a source locator module that obtains performance information on physical computer resources and performance information on virtual computer resources of the extracted virtual machines and server computers and the virtual machine and the server computer in which the latency has increased to locate a part in which the latency has increased.

This invention provides prompt detection of an increase in processing latency occurring in a network in a data center using a virtual computer system, a virtualization module in a server computer, or a virtual machine and prompt location of the part which has caused the increase in latency.

BRIEF DESCRIPTION OF THE DRAWINGS

FIG. 4 shows the first embodiment of this invention, is an explanatory drawing exemplifying a communication flow information 301 held in the network monitoring server.

FIG. 5 shows the first embodiment of this invention, is an explanatory drawing exemplifying shared resource information 302 held in the network monitoring server.

DETAILED DESCRIPTION OF THE EMBODIMENTS

Hereinafter, preferred embodiments of this invention will be described with reference to the accompanying drawings.

First Embodiment

Figure 1:
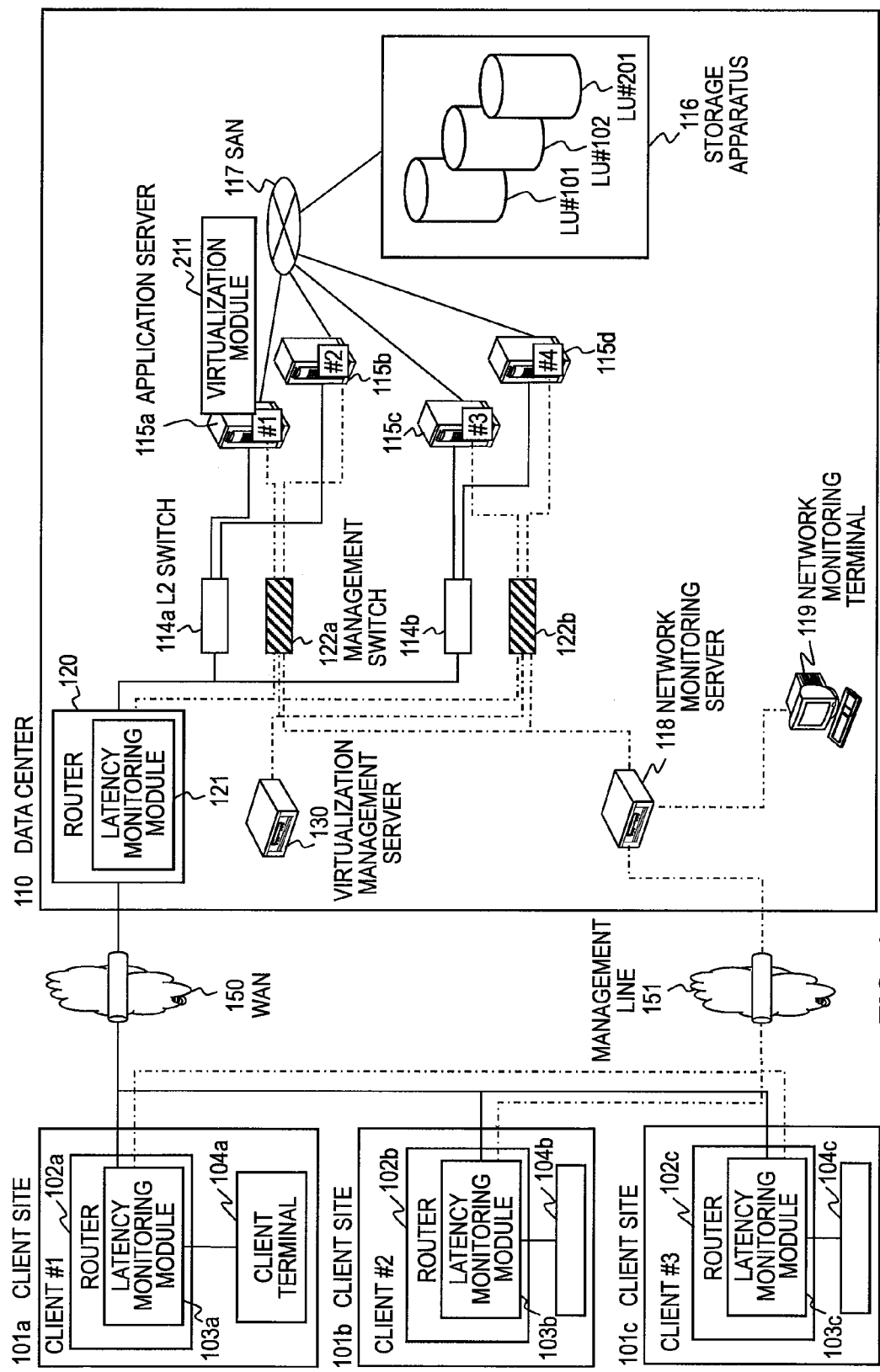
FIG. 1 is a block diagram exemplifying a computer system that provides cloud services using a wide area network to illustrate a first embodiment of a first invention.

FIG. 1 is a block diagram exemplifying a computer system that provides cloud services using a WAN (wide area network) to illustrate a first embodiment of this invention.

A data center 110 for providing cloud services is connected with client sites 101a, 101b, and 101c via a WAN 150. The client site 101a that uses the cloud services of the data center 110 comprises a router 102a, which is connected to the WAN 150 to transmit and receive packets, and a client terminal 104a, which is connected to the router 102a to receive the cloud services of the data center 110. Likewise, the other client sites 101b and 101c comprise respective routers 102b and 102c connected to the WAN 150 and respective client terminals 104b and 104c for receiving the cloud services. Since the client sites 101a to 101c have the same configuration, only the client site 101a will be explained in the following description and the explanations on the other client sites 101b and 101c will be omitted.

This embodiment employs an example of PaaS (Platform as a Service), which offers a platform from the WAN 150 to virtual machines in the data center 110 to clients (client sites). In this example, a client installs desired business applications in virtual machines to operate the business applications. In this example, the provider of the data center 110 manages a network within the data center 110 and application servers including hardware resources and virtual machines; a communications carrier manages the WAN 150; and the client manages the business applications in the virtual machines.

The router 102a in the client site 101a includes a latency monitoring module 103a. The latency monitoring module 103a monitors, under predetermined monitoring conditions, latency in processing (or communication), which is the difference between the time the router 102a receives a processing request to the data center 110 from the client terminal 104a and the time the router 102a transmits a result of processing by the data center 110 in response to the processing request to the client terminal 104a upon receipt from the data center 110. When the latency exceeds a predetermined threshold TH2, the latency monitoring module 103a detects an increase in the processing (or communication) latency. The latency monitoring module 103a is connected to a network monitoring server 118 in the data center 110 via a management line 151. When the processing latency exceeds the predetermined threshold TH2, the latency monitoring module 103a determines that the processing latency has increased because of some fault and notifies the network monitoring server 118 of the increase in latency. If the management line 151 independent of the WAN 150 is not available, the latency monitoring module 103a may be connected to the network monitoring server 118 via the WAN 150. The above-mentioned latency means a latency (response time) in processing and communication when observed from the client terminals 104a to 104c.

The client terminal 104a in the client site 101a is configured with a computer including a processor, a memory, and a storage device and receives services from the data center 110 via the router 102a and the WAN 150.

The data center 110 mainly comprises a router (network device) 120 connected to the WAN 150, application servers 115a to 115d (#1 to #4) for providing services to the client terminal 104a in the client site 101a and others, layer 2 (L2) switches 114a and 114b for configuring a business network connecting the application servers 115a to 115d and the router 120, a storage area network (SAN) for connecting the application servers 115a to 115d and a storage apparatus 116, a virtualization management server 130 which is connected to management switches 122a and 122b for configuring a management network and manages virtualization modules 211 in the application servers 115a to 115d, and a network monitoring server 118 connected to the management switches 122a and 122b for configuring the management network and the management line 151. When the network monitoring server 118 detects an increase in processing latency, it collects performance monitoring information from computer resources in the data center 110, locates the part where the latency has increased and the part that has caused the increase in latency, and notifies them to a network monitoring terminal 119. A virtualization module 211 may be configured with a hypervisor or a virtual machine monitor (VMM).

The router 120 connected to the WAN 150 is connected to the L2 switches 114a and 114b in the business network and receives processing requests from the client sites 101a to 101c and transfers the processing requests to the destination application servers 115a to 115d with reference to communication flow information included in the processing requests. The router 120 also transfers the results of processing sent by the application servers 115a to 115d to the destination client sites 101a to 101c with reference to communication flow information included in the results of processing. In an example using the WAN 150 and TCP/IP for the business network, the communication flow information includes a destination IP address, a port number, and a source IP address.

The router 120 includes a latency monitoring module 121 that detects an increase in processing latency within the data center 110 and notifies the network monitoring server 118 of it. The latency monitoring module 121 detects an increase in processing latency in the data center 110 from the receipt time of a processing request from any of the client sites 101a to 101c, the transmission time of the result of processing responded to the processing request by any of the application servers 115a to 115d, and a predetermined threshold TH1, under predetermined monitoring conditions. When the difference between the receipt time of a processing request and the transmission time of the result of processing exceeds a predetermined time of the threshold TH1, the latency monitoring module 121 determines that the latency has increased because of some fault in the data center 110 and notifies the network monitoring server 118 of the delay.

The network monitoring server 118, the latency monitoring module 121, and the application servers 115a to 115d are connected via the management network configured with the switches 122a and 122b. The network monitoring server 118 receives delay notices from the latency monitoring module 121 via the management network and receives delay notices from the latency monitoring modules 103a to 103c in the client sites 101a to 101c via the management line 151. The network monitoring server 118 connected with the application servers 115a to 115d via the management network collects performance monitoring information from application servers 115a to 115d and virtual machines which might develop an increase in latency.

When the network monitoring server 118 receives a delay notice from any of the routers 102a to 102c in the client sites 101a to 101c and the router 120 in the data center 110, it refers to the communication flow information and locates the application server and the virtual machine which have developed the delay out of the plurality of application servers 115a to 115d to narrow down the physical servers (application servers) and the virtual machines to be examined. The network monitoring server 118 collects performance monitoring information on the application server and the virtual machine determined that have developed the increase in latency to locate the part which has caused the increase in latency (the source of performance degradation). In particular, if the part which has developed the increase in latency is a virtual machine, the network monitoring server 118 collects performance monitoring information on the virtual machine and other virtual machines sharing computer resources with the specific virtual machine to determine the part that has caused the increase in latency to be the source of performance degradation.

The network monitoring server 118 notifies the network monitoring terminal 119 of the part that has developed the increase in latency and the part that has caused the increase in latency determined in the preceding operations. The network monitoring terminal 119 displays the part that has developed the increase in latency and the part that has caused the increase in latency on its monitor as the sources of the service performance degradation in the computer system with reference to the notice received from the network monitoring server 118. The part that has developed the increase in latency and the part that has caused the increase in latency may be the same part (for example, a virtual machine) or different parts.

The virtualization management server 130 is connected to the application servers 115a to 115d via the management network configured with the switches 122a and 122b. The virtualization management server 130 manages the virtualization modules 211 in the application servers 115a to 115d to create, delete, or migrate a virtual machine. In this embodiment, the virtualization management server 130 also manages addition and deletion of application servers 115a to 115d.

The storage apparatus 116 is connected to the SAN 117 and includes logical units (LUs) #101, #102, and #201 to be accessed by the application servers 115a to 115d. The LUs #101 to #201 may be associated with the identifiers of RAID groups in the storage apparatus 116 as shown in FIG. 5.

In the following descriptions, the client sites 101a to 101c will be generically designated as client sites 101; the routers 102a to 102c, as routers 102; the latency monitoring modules 103a to 103c, as latency monitoring modules 103; and the client terminals 104a to 104c, as client terminals 104.

Figure 2:
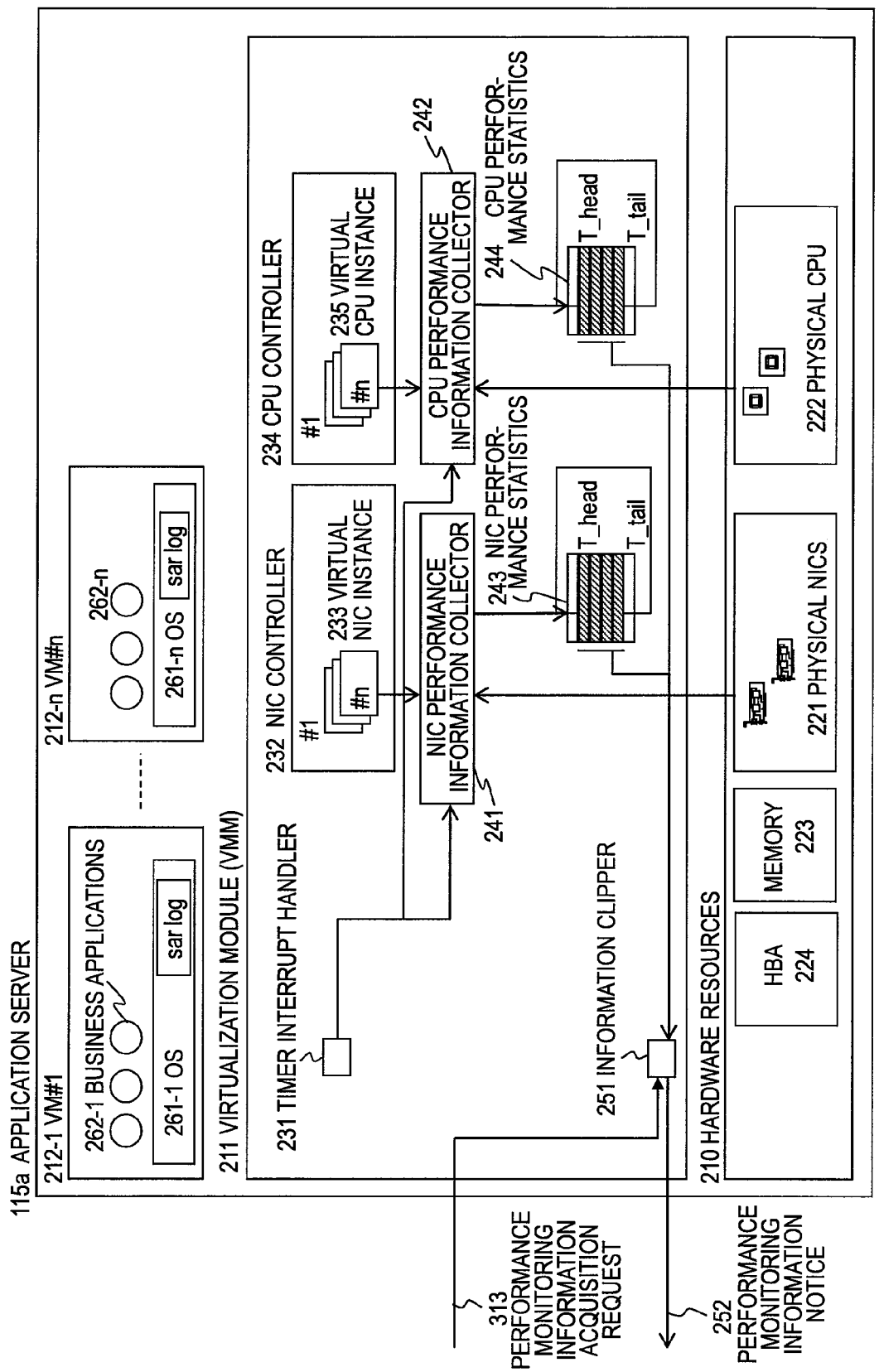
FIG. 2 shows the first embodiment of this invention, is a block diagram illustrating a configuration of the application server.

FIG. 2 is a block diagram illustrating a configuration of the application server 115a. Since the application servers 115b to 115d have the same configuration, repetitive explanations are omitted.

The application server 115a provides the client sites 101 with predetermined services. The application server 115a comprises hardware resources 210 including a physical CPU (or a physical processor) 222 for computing, a memory 223 for storing data, programs, a virtualization module, and virtual machines, a plurality of physical NICs (or physical network interfaces) 221, and a host bus adapter (HBA) 224 connected to the SAN 117. The physical NICs 221 are individually connected to the business network configured with the L2 switches 114a and 114b and the management network configured with the management switches 122a and 122b.

In the application server 115a, a virtualization module (VMM) 211 is implemented. The virtualization module 211 allocates the physical computer resources of the application server 115a to virtual machines 212-1 to 212-n in accordance with instructions from the virtualization management server 130 to implement the virtual machines.

The virtualization module 211 implements n number of virtual machines 212-1 to 212-n. In the virtual machines 212-1 to 212-n, operating systems (OS) 261-1 to 261-n, respectively, are implemented, and business applications 261-1 to 262-n are executed under each OS (guest OS) to provide services to the client sites 101. The virtualization module 211 assigns identifiers VM#1 to VM#n to the virtual machines 212-1 to 212-n, respectively. Furthermore, the virtualization module 211 allocates virtual CPUs #1 to #n to the virtual machines 212-1 to 212-n through a CPU controller 234 and virtual NICs #1 to #n to the virtual machines 212-1 to 212-n through an NIC controller 232. In the following descriptions, the OSs 261-n to 261-n will be generically designated as OSs 261; the business applications 262-1 to 262-n, as business applications 262; and the virtual machines 212-1 to 212-n, as virtual machines 212.

The virtualization module 211 virtualizes the hardware resources 210 and allocates them to the virtual machines 212. Since virtualizing the hardware resources 210 and allocating the virtualized resources to virtual machines 212 can be made by a publicly or commonly known method, details will be omitted in this description.

The virtualization module 211 includes a CPU controller 234 for providing the virtual machines 212 with virtual CPUs obtained by virtualizing the physical CPU 222 and an NIC controller 232 for providing the virtual machines 212 with virtual NICs obtained by virtualizing the physical NICs 221. Although not shown, the virtualization module 211 also includes a controller for providing virtual HBAs obtained by virtualizing the HBA.

The CPU controller 234 manages the virtual CPUs allocated to the virtual machines 212 in a virtual CPU instance 235. The virtual CPU instance 235 coordinates the processes to be executed by the virtual CPUs #1 to #n associated with the virtual machines 212-1 to 212-n with the processes to be executed by the physical CPU 222. The virtual CPU instance 235 also obtains performance monitoring information (for example, CPU utilization rates or busy rates) on each of the virtual CPUs #1 to #n. The performance monitoring information of the virtual CPUs #1 to #n may be obtained through the OSs 261-1 to 261-n in the virtual machines 212-1 to 212-n.

The NIC controller 232 manages the virtual NICs allocated to the virtual machines 212 in a virtual NIC instance 233. The virtual NIC instance 233 coordinates communications through the virtual NICs #1 to #n associated with the virtual machines 212-1 to 212-n and communications through the physical NICs 221. The NIC controller 232 also obtains performance monitoring information on each of the virtual NICs #1 to #n. The performance monitoring information on the virtual NICs #1 to #n may include data transfer rates per unit time period and packet latencies, for example. In the example of TCP/IP, packet transfer rates per unit time period and packet types (such as ARP, TCP and UDP) may be used as performance monitoring information on Layer 2 (L2); packet transfer rates per unit time period or latencies at every TCP connection may be used as performance monitoring information on Layer 3 (L3). Out of these, data transfer rates per predetermined unit time period or packet latencies may be adopted as the performance monitoring information. The performance monitoring information on the virtual NICs #1 to #n may be obtained through the OSs 261-1 to 261-n in the virtual machines 212-1 to 212-n.

The virtualization module 211 further includes a CPU performance information collector 242 for collecting performance monitoring information on CPUs and a NIC performance information collector 241 for collecting performance monitoring information on NICs, and a timer interrupt handler 231 for activating the CPU performance information collector 242 and the NIC performance information collector 241 in a predetermined cycle.

The timer interrupt handler 231 transmits triggers to the CPU performance information collector 242 and the NIC performance information collector 241 in a predetermined time cycle (of 10 msec, for example). The CPU performance information collector 242 and the NIC performance information collector 241 collect performance information every time they receive the triggers from the timer interrupt handler 231.

The CPU performance information collector 242 collects performance monitoring information (for example, CPU utilization rates) from the physical CPU 222 and performance monitoring information on virtual CPUs #1 to #n from the virtual CPU instance 235 in the CPU controller 234 and stores them in CPU performance statistics 244. The CPU performance statistics 244 may include the time stamps of the collected performance monitoring information.

The CPU performance information collector 242 associates the collected performance monitoring information with the identifier of the physical CPU 222 or the identifiers of the virtual CPUs and stores them in the CPU performance statistics 244. In the CPU performance statistics 244, performance monitoring information on the physical CPU 222 and the virtual CPUs during a predetermined period (for example, for 10 minutes or 20 minutes) are stored in a predetermined cycle.

In storing the latest performance monitoring information on the physical CPU 222 and the virtual CPUs, the CPU performance information collector 242 deletes the oldest data held at T_tail in the CPU performance statistics 244, shifts the data at T_head and the followings toward the T_tail, and then stores the latest data at T_head. Otherwise, the storage area for the CPU performance statistics 244 may be configured with a ring buffer and a pointer may be moved to write the latest data at the oldest data T_tail.

The NIC performance information collector 241 collects performance monitoring information (for example, data transfer rates per unit time period or packet latencies, like those on virtual NICs) from the physical NICs 221 and performance monitoring information on virtual NICs #1 to #n from the virtual NIC instance 233 in the NIC controller 232 to store them in the NIC performance statistics 243. The NIC performance statistics 243 may include the time stamps of the collected performance monitoring information.

The NIC performance information collector 241 associates the collected performance monitoring information with the identifiers of the physical NICs 221 or the identifiers of the virtual NICs and stores them in the NIC performance statistics 243. The identifiers of the physical NICs 221 or the virtual NICs may be MAC addresses. The MAC address of a virtual NIC is a value which the virtualization module 211 or the virtualization management server 130 assigns. In the NIC performance statistics 243, performance monitoring information on the physical NICs 221 and the virtual NICs during a predetermined time period (for example, for 10 minutes or 20 minutes) are stored in a predetermined cycle. In storing the latest performance monitoring information on the physical NICs 221 and the virtual NICs, the NIC performance information collector 241 deletes the oldest data held at T_tail in the NIC performance statistics 243, shifts the data at T_head and the followings toward the T_tail, and then stores the latest data at T_head. Otherwise, the storage area for the NIC performance statistics 243 may be configured with a ring buffer and a pointer may be moved to write the latest data at the oldest data T_tail.

The virtualization module 211 includes an information clipper 251 in order to locate the source of an increase in latency. When the information clipper 251 receives a performance monitoring information acquisition request 313 from the network monitoring server 118, it obtains the CPU performance statistics 244 and the NIC performance statistics 243 to send them back to the network monitoring server 118 as a performance monitoring information notice 252.

The virtualization module 211 virtualizes the physical resources of the application servers 115a to 115d and allocates them to the virtual machines 212-1 to 212-n in accordance with an instruction of the virtualization management server 130, but the details of the operations are omitted in this description because the physical resources can be allocated to the virtual machines through a publicly or commonly known method.

Figure 3:
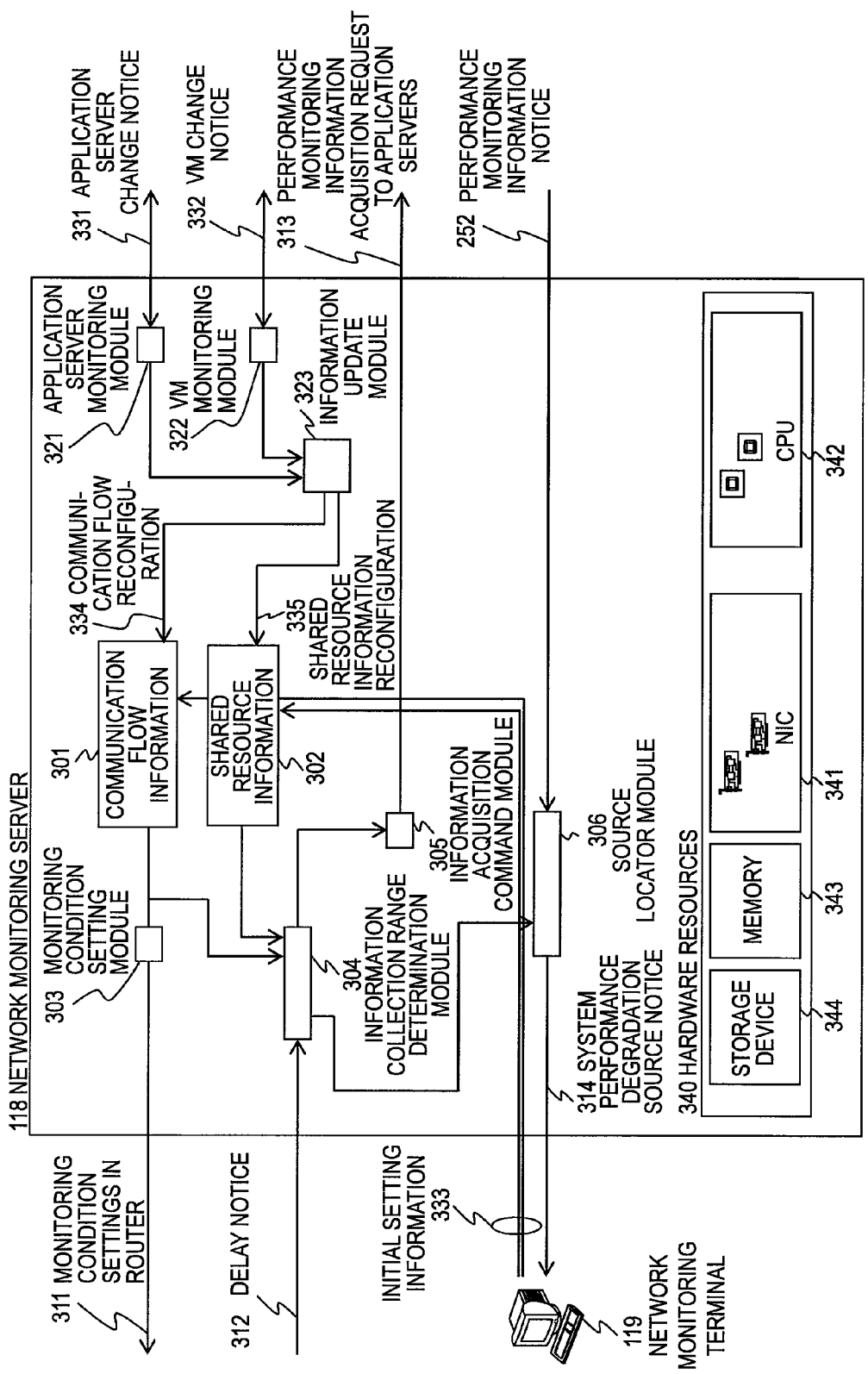
FIG. 3 shows the first embodiment of this invention, is a block diagram illustrating a configuration of the network monitoring server.

FIG. 3 is a block diagram illustrating a configuration of the network monitoring server 118. The network monitoring server 118 monitors the routers 102 in the client sites 101 and the router 120 in the data center 110. If the latency in some service provided by the data center 110 has increased, the network monitoring server 118 locates the part which has developed the increase in the latency and the part which might cause the increase in the latency and outputs them to the network monitoring terminal 119. In other words, the network monitoring server 118 functions as a system performance degradation source locator apparatus upon detection of an increase in latency at any of the routers 120 and the router 102.

The network monitoring server 118 comprises hardware resources 340 including a physical CPU (or a physical processor) 342 for computing, a memory 343 for storing programs to be executed by the physical CPU 342 and data, a plurality of physical NICs (or physical network interfaces) 341, and a non-volatile storage device 344 as a storage medium for storing programs. The physical NICs 341 are individually connected to the management line 151, the network monitoring terminal 119, and the management network configured with the management switches 122a and 122b. The network monitoring server 118 may comprise an HBA to use the storage apparatus 116 as the storage device 344.

The network monitoring server 118 stores communication flow information 301 and shared resource information 302 received from the network monitoring terminal 119 in the memory 343. The network monitoring server 118 implements modules that work with the communication flow information 301 and the shared resource information 302: a monitoring condition setting module 303, an information collection range determination module 304, an information acquisition command module 305, and a source locator module 306. These modules are stored in the storage device 344 as programs and the physical CPU 342 loads them to the memory 343 for implementation.

The communication flow information 301 and the shared resource information 302 are included in initial setting information 333 inputted by an administrator from the network monitoring terminal 119.

The communication flow information 301 is, as will be described later, a table for setting association relations among the IP addresses of communication destinations included in processing requests from the client sites 101, the identifiers of the application servers 115a to 115d, and the identifiers of the virtual machines 212-1 to 212-n.

The shared resource information 302 is, as will be described later, a table for setting association relations among the identifiers of the application servers 115a to 115d, the identifiers of the virtual machines 212-1 to 212-n, the identifiers of the storage apparatus 116 to be used by the application servers 115a to 115d, and the identifies of storage areas of the storage apparatus 116. In this embodiment, the identifiers of the storage areas of the storage apparatus 116 are indicated as logical units (LUs) #101, #102, and #201, but are not limited to these.

The application server monitoring module 321 monitors addition and deletion of application servers. Upon receipt of an application server change notice 331 (for addition or deletion) from the virtualization management server 130, the application server monitoring module 321 finds the application server which has been added or deleted and notifies an information update module 323 about it. The application server change notice 331 includes the mode of change (either addition or deletion) and the identifier of the application server 115.

The VM monitoring module 322 monitors addition, migration, and deletion of virtual machines 212 in the application servers 115a to 115d. The VM monitoring module 322 receives a virtual machine (VM) change notice 332 (for addition, migration, or deletion) from the virtualization management server 130 and notifies the information update module 323 of the addition, migration, or deletion of a virtual machine included in the notice. The virtual machine change notice 332 includes the mode of change (any one of addition, deletion, or migration), the identifier and the IP address of the virtual machine 212, the identifier of the application server 115, and the identifiers of computer resources shared with other virtual machines 212.

The information update module 323 updates the communication flow information 301 and the shared resource information 302 (in FIG. 3, communication flow reconfiguration 334 and shared resource information reconfiguration 335, respectively).

The monitoring condition setting module 303 sets conditions of communications to be monitored (monitoring conditions) for increase in latency to the latency monitoring modules 103a to 103c in the routers 102 at the client sites 101 and the latency monitoring module 121 in the router 120 at the data center 110. In this embodiment, destination IP addresses included in processing requests from the client sites 101 and a threshold time from the receipt of the processing request to the transmission of the processing response are used for the monitoring conditions by way of example. The monitoring conditions, however, are appropriate if a delay exceeding the threshold time can be detected in a response from the data center 110 to a process requested by a client terminal 104 in a client site 101. Accordingly, the monitoring conditions are not limited to the IP addresses, or to the TCP/IP.

As to the threshold time from the receipt of a processing request from a client terminal to the processing response, a threshold TH1 (a first threshold) to be set to the latency monitoring module 121 in the router 120 at the data center 110 and a threshold TH2 (a second threshold) to be set to the latency monitoring modules 103 in the routers 102 at the client sites 101 are set from the network monitoring terminal 119.

The latency monitoring modules 103 and 121 in the routers 102 and 120 monitor the time from the receipt of a processing request to the response to it in communications (packets) including the IP addresses set by the monitoring condition setting module 303, and if the time from a processing request to its response exceeds the threshold TH1 or TH2, the module which has detected the delay transmits a delay notice 312 indicating that the processing latency has increased to the network monitoring server 118.

The threshold TH1 set to the latency monitoring module 121 in the router 120 is a threshold for processing time in the data center 110 and may be set at several milliseconds. If the time to respond to a processing request of a client terminal 104 exceeds the threshold TH1, the latency monitoring module 121 in the router 120 determines that the processing latency has increased in the data center 110 and transmits a delay notice 312 including the destination IP address and the identifier of the router 120 to the network monitoring server 118.

The threshold TH2 for the router 102 is a threshold obtained by adding some traffic latency in the WAN 150 to the processing time in the data center 110. The value of the threshold TH2 is set at an appropriate time period depending on the traffic speed in the WAN 150 and the distance between the client sites 101 and the data center 110. For example, if all of the client sites 101 and the data center 110 are located in the same country, the threshold TH2 may be set at 10 to 20 msec; if the client sites 101 are in the country and the data center 110 is outside the country, the threshold TH2 may be set at 100 to 120 msec. The thresholds TH1 and TH2 can be set by the administrator who uses the network monitoring server 118 by means of the initial setting information 333, for example.

If the time period to respond to a processing request of a client terminal 104 exceeds the second threshold TH2, the latency monitoring module 103 in the router 102 determines that the processing latency has increased in either the WAN 150 or the data center 110 and transmits a delay notice 312 including the destination IP address designated by the client terminal and the identifier of the router 102 to the network monitoring server 118.

The latency monitoring modules 103 and 121 in the routers 102 and 120 do not need to monitor all communications between the client sites 101 and the data center 110, but only communications including the destination IP addresses designated by the latency monitoring module 121. This suppresses increase in load in the monitoring operations by the routers 102 and 120.

Every time the communication flow information 301 is updated, the monitoring condition setting module 303 notifies the latency monitoring modules 103a to 103c in the routers 102a to 102c and the latency monitoring module 121 in the router 120 about the monitoring conditions to make them updated.

Upon receipt of a delay notice 312 from any of the routers 102a to 102c and the router 120, the information collection range determination module 304 determines the range of computer resources to be examined in order to locate the source of the increase in latency with reference to the communication flow information 301 and the shared resource information 302. The delay notice 312 includes the destination IP address of the communication in which the latency has increased.

The information collection range determination module 304 determines an application server 115x and a virtual machine 212-y to be the suspects which might have developed the increase in processing latency from the destination IP address included in the delay notice 312. The application server 115x is any one of the application servers 115a to 115d in FIG. 1 and the virtual machine 212-y is any one of the virtual machines 212-1 to 212-n in FIG. 2.

Next, the information collection range determination module 304 sets virtual machines 212-z that share computer resources with the virtual machine 212-y in the application server 115x, which has been determined to be the part that has developed the increase in processing latency, to the range of performance monitoring information collection. This is because it is necessary to determine whether the source of the increase in latency in the suspect virtual machine 212-y is only the suspect virtual machine 212-y or whether performance degradation in the computer resources shared by the virtual machine 212-y and other virtual machines has caused the increase in latency in the virtual machine 212-y.

The cause of the increase in latency may be considered that performance in the application server 115x of a physical server or the virtualization module 211 has degraded or that performance in the computer resources shared by the virtual machine 212-y and other virtual machines 212-z has degraded. The computer resources shared by the virtual machine 212-y and other virtual machines 212-z are the hardware resources 210 of the application server 115x, the virtualization module 211, the storage apparatus 116, and the SAN 117.

In this way, the range of performance monitoring information collection is expanded to the virtual machines 212-z sharing the computer resources with the suspect parts, so that which part of the data center 110 is the source of the increase in processing latency can be exactly located.

The information collection range determination module 304 notifies the information acquisition command module 305 that the range of performance monitoring information collection is the application server 115x and the virtual machine 212-y determined to be the suspects that might have developed the increase in processing latency and the virtual machine 212-z sharing the computer resources with the virtual machine 212-y.

The information acquisition command module 305 transmits a performance monitoring information acquisition request 313 to the application server 115x determined by the information collection range determination module 304. This performance monitoring information acquisition request 313 requests CPU performance statistics 244 and NIC performance statistics 243 as the performance monitoring information on the application server 115x, the virtual machine 212-y, and the virtual machines 212-z. As will be described later, the information acquisition command module 305 may request the CPU performance statistics 244 and NIC performance statistics 243 individually. To request one of them individually, the performance monitoring information acquisition request should include information for designating the acquisition target, the CPUs or the NICs. Alternatively, the information acquisition command module 305 may issue a plurality of kinds of performance monitoring information acquisition requests such as a CPU performance monitoring information acquisition request and an NIC performance monitoring information acquisition request.

The information clipper 251 of the application server 115x responds to the performance monitoring information acquisition request 313 by transmitting the CPU performance statistics 244 and the NIC performance statistics 243 to the network monitoring server 118.

The source locator module 306 in the network monitoring server 118 receives the CPU performance statistics 244 and the NIC performance statistics 243 sent from the application server 115x. The suspect application server 115x may transmit the CPU performance statistics 244 and the NIC performance statistics 243 as they are or after extracting CPU performance monitoring information and NIC performance monitoring information on the requested virtual machines 212-y, and -z, and the application server 115x. If the application server 115x transmits the CPU performance statistics 244 and the NIC performance statistics 243 as they are, the source locator module 306 extracts performance monitoring information on the suspect virtual machines 212-y, and -z, and the application server 115x from the CPU performance statistics 244 and the NIC performance statistics 243.

As will be described later, the source locator module 306 determines the part which have developed the increase in latency to be the suspect parts in accordance with the source of the delay notice 312 and the destination IP address of the communication. The source locator module 306 examines whether the processing latency has increased or not in the application server 115x with reference to the NIC performance statistics 243 on the suspect parts and whether the virtual CPU utilization rates have increased or not with reference to the CPU performance statistics 244 to locate the part where performance has degraded as the source of the increase in processing latency. The suspect parts and the part where performance has degraded are any of the WAN 150, the networks in the data center 110, the virtualization module 211 or the application server 115x, and the business applications 262 on the virtual machine 212-y.

The source locator module 306 outputs the located suspect parts and the located part where performance has degraded to the network monitoring terminal 119. The administrator of the data center 110 notifies the provider of the WAN 150 if the suspect part or the part where performance has degraded is the WAN 150.

If the suspect part or the part where performance has degraded is the virtualization module 211, the administrator notifies the vendor of the virtualization module 211. If the suspect part or the part where performance has degraded is the networks in the data center 110, the administrator instructs the operational administrator of the networks in the data center for restoration. If the suspect parts or the part where performance has degraded is the application server 115x, the administrator instructs the person in charge of the application servers 115a to 115d for restoration or reinforcement of the resources. If the suspect parts or the part where performance has degraded is the virtual machine 212-y, the administrator notifies the client using business applications in the virtual machine 212-y of the increase in latency.

Upon receipt of a delay notice 312 from any of the routers 102 and 120, the network monitoring server 118 in this embodiment first determines in which part the latency has increased, the WAN 150 or the data center 110.

If the WAN 150 has developed the increase in latency, the network monitoring server 118 issues a warning to the administrator through the network monitoring terminal 119 to request the communication carrier which manages the WAN 150 to fix it.

If the data center 110 has developed the increase in latency, the network monitoring server 118 determines the virtual machine 212-y and the application server 115x corresponding to the IP address where the latency has increased to be the suspect parts (the parts where the latency has increased). Furthermore, the network monitoring server 118 expands the range of performance monitoring information collection to the virtual machines 212-z that share computer resources with the suspect virtual machine 212-y. Consequently, the network monitoring server 118 can promptly find performance degradation (or a fault) in the virtualization module 211 or performance degradation in the physical computer (application server 115x) to locate the source of the performance degradation (the increase in latency). These operations remove application servers 115a to 115d and virtual machines 212 which are not addressed in communications from the client sites 101 from the monitoring targets and narrow down the computer resources from which performance monitoring information should be obtained, so that the network monitoring server 118 can be prevented from being overloaded and the part which has caused the increase in processing latency can be immediately located.

The network monitoring terminal 119 is configured with a computer including a processor, a memory, and a storage device and is connected to the network monitoring server 118.

FIG. 4 is an explanatory drawing exemplifying a communication flow information 301 held in the network monitoring server 118.

The communication flow information 301 is a table that associates information on communications of application servers 115a to 115d that provide services to the client terminals 104 in the client sites 101, information on physical computers (application servers), and information on virtual machines. The communication flow information 301 is created from the initial setting information 333 inputted by the administrator through the network monitoring terminal 119 and updated by the information update module 323 with change of application servers 115a to 115d or virtual machines 212.

In the communication flow information 301, an entry is comprised of a destination IP address 501 for storing the IP address assigned to a virtual machine 212 for providing services, an identifier of an application server 115a, 115b, 115c, or 115d implementing a virtual machine 212, and a VM number 503 for storing the identifier set to the virtual machine.

The destination IP addresses 501 are addresses that the client terminals 104 in the client sites 101 use as destination IP addresses and are values set by the administrator through the network monitoring terminal 119.

The application server numbers 502 are values set by the administrator through the network monitoring terminal 119 to identify the application servers 115a to 115d in the data center 110.

The VM numbers 503 are values set by virtualization modules 211 to identify the virtual machines 212-1 to 212-n in the application servers 115a to 115d.

In the example of FIG. 4, the entries 511 and 512 indicate that two virtual machines VM#1 and VM#2 run on the application server 115a (APServ#1) to provide services and the entry 513 indicates that a virtual machine VM#1 runs on the application server 115b (APServ#2) to provide services.

FIG. 5 is an explanatory drawing exemplifying shared resource information 302 held in the network monitoring server 118.

The shared resource information 302 is a table for storing setting information of physical resources in the data center 110 shared by the virtual machines 212-1 to 212-n. The shared resource information 302 is created from the initial setting information 333 inputted by the administrator through the network monitoring terminal 119 and updated by the information update module 323 with change of application servers 115a to 115d or virtual machines 212.

In the shared resource information 302, an entry is comprised of an application server number 601 for storing the identifier of an application server 115a, 115b, 115c, or 115d, a VM number 602 for storing the identifier set to a virtual machine, a storage apparatus number 603 for storing the identifier of a storage apparatus 116 allocated to the virtual machine, and an LU number 604 for storing the identifier of a storage area in the storage apparatus 116.

The application server numbers 601 are the same as the application server numbers 502 in the communication flow information 301 and are values set by the administrator through the network monitoring terminal 119 to identify the application servers 115a to 115d.

The VM numbers 602 are the same as the VM numbers 503 in the communication flow information 301 and are values set by the virtualization modules 211 to identify the virtual machines 212-1 to 212-n in the application servers 115a to 115d.

The storage apparatus numbers 603 are values set by the administrator through the network monitoring terminal 119 to identify the storage units in the data center 110.

The LU numbers 604 are values set by the administrator through the network monitoring terminal 119 to identify the storage areas in the storage apparatus 116.

In the example of FIG. 5, the entries 611 and 612 indicate that two virtual machines VM#1 and VM#2 run on the application server 115a (APServ#1), the LU#101 in the storage apparatus 116 (RAID#1) is allocated to the virtual machine VM#1, the LU#102 in the storage apparatus 116 (RAID#1) is allocated to the virtual machine VM#2. Namely, they indicate that the application server 115a (the virtualization module 211) and the storage apparatus 116 are shared by the virtual machines VM#1 and VM#2 in the application server 115a (APServ#1).

Figure 6:
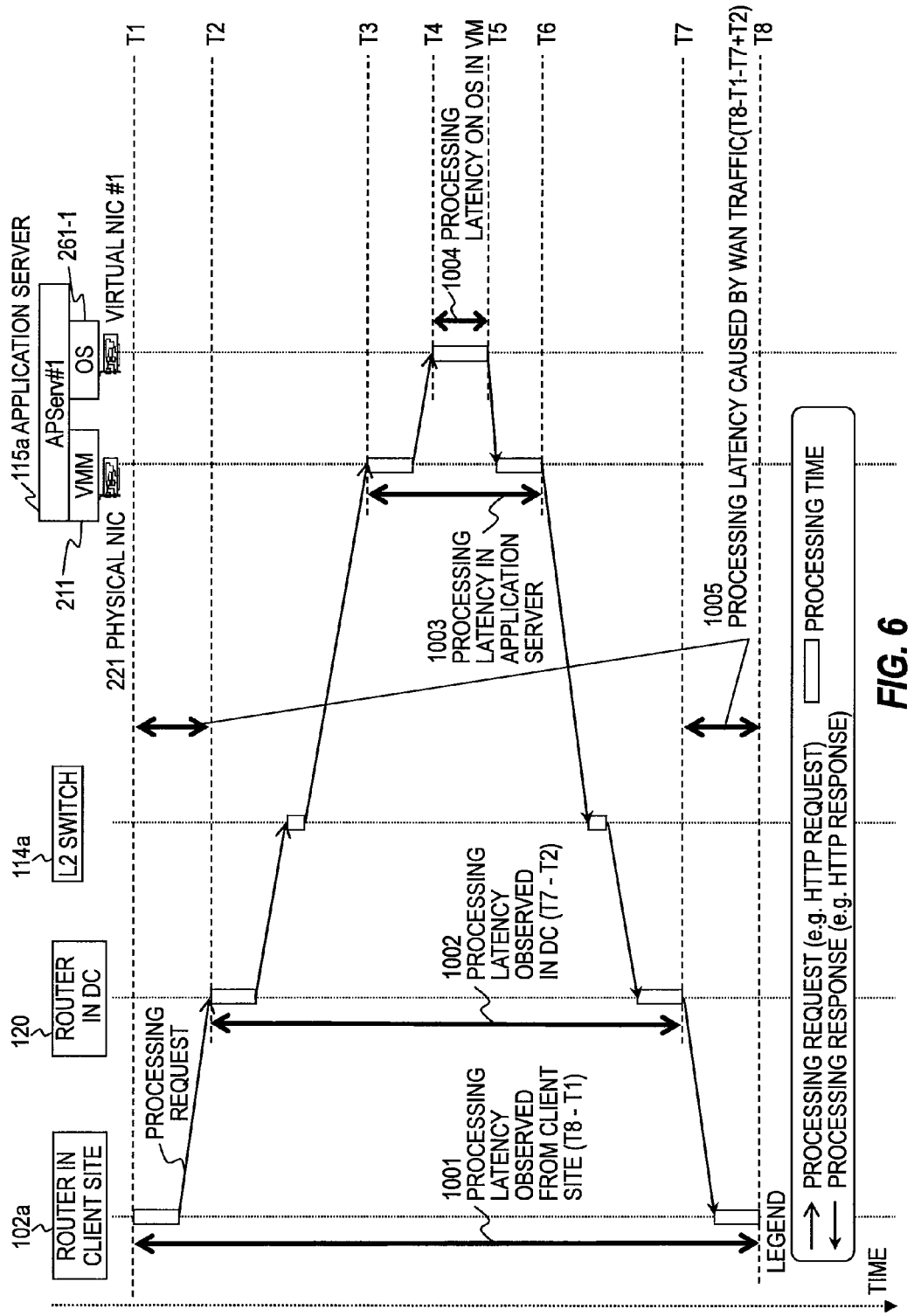
FIG. 6 shows the first embodiment of this invention, is a time chart illustrating a processing latency when the client site 101a accesses the OS 261-1 running on the application server 115a in the data center.

FIG. 6 is a time chart illustrating a processing latency when the client site 101a accesses the OS 261-1 running on the application server 115a (APServ#1) in the data center 110. In the example of FIG. 6, the client terminal 104a in the client site 101a accesses a business application 262-1 on the OS 261-1 (the virtual machine 212-1(VM#1)).

The client terminal 104a in the client site 101a transmits a processing request to a business application on the OS 261-1 (virtual machine 212-1) running in the application server 115a in the data center 110 and the router 102a in the client site 101a receives the processing request at the time T1 in FIG. 6.

The latency monitoring module 103a in the router 102a preliminarily receives destination IP addresses 501 as monitoring conditions from the monitoring condition setting module 303 in the data center 110 and holds them. The latency monitoring module 103a in the router 102a starts monitoring the time period to receive a response to the processing request of the client terminal 104a from the data center 110. The router 102a transmits the processing request received from the client terminal 104a to the router 120 in the data center 110 via the WAN 150.

In FIG. 6, illustrated is an example in which the processing request is an HTTP request and the processing response is an HTTP response. As to an HTTP request and an HTTP response, one response is transmitted to one request and received at every TCP end point (the source IP address, the source port number, the destination IP address, and the destination port number). Accordingly, monitoring an HTTP response to an HTTP request allows measurement of a latency in processing including communication.

At time T2, the router 120 in the data center 110 receives the processing request from the router 102a in the client site 101a via the WAN 150.

The latency monitoring module 121 in the router 120 starts monitoring the time period to return a response to the processing request of the client site 101a to the client site 101a upon receipt of the response from the application server 115a. The router 120 transmits the processing request received via the WAN 150 to the application server 115a at the destination IP address via the business network (the L2 switch 114a).

At time T3, a physical NIC 221 in the application server 115a receives the processing request via the business network and the virtualization module 211 forwards the processing request to the OS 261-1 (virtual machine 212-1) corresponding to the destination IP address. At time T4, the OS 261-1 receives the processing request from the virtualization module 211 controlling the physical NIC 221 and the business application 262-1 running on the OS starts processing the request. Then, at time T5, it completes the processing. The OS 261-1 transmits the result of processing the request as a processing response from the physical NIC 221 to the client site 101a via the virtualization module 211 at the time T5.

At time T6, the virtualization module 211 that has received the processing response from the OS 261-1 forwards the processing response to the business network (L2 switch 114a) via the physical NIC 221. The router 120 in the data center 110 receives the processing response of the application server 115a sent via the business network and transmits the processing response to the WAN 150 at time T7.

At the time T7, the latency monitoring module 121 in the router 120 obtains the difference between the time T2 of receipt of the processing request including the destination IP address X and the source IP address Y from the client site 101a and the time T7 of transmission of the processing response which has been received from the application server 115a and includes the destination IP address Y and the source IP address X for a processing latency in the data center 110.

If the obtained processing latency is above a predetermined threshold TH1, the latency monitoring module 121 in the router 120 notifies the network monitoring server 118 of the increase in latency.

At time T8, the router 102a in the client site 101a receives the processing response from the data center 110 via the WAN 150.

The latency monitoring module 103a in the router 102a holds the destination IP address X and the source IP address Y included in the processing request received from the client terminal 104a at the time T1. If the destination IP address of the processing response received from the data center 110 is Y and the source IP address is X, the latency monitoring module 103a defines the transmission time of the processing response to the client terminal 104a as time T8 and obtains the difference between the time T8 and the time T1 for a processing (or communication) latency observed from the client site 101a.

If the processing latency is above a predetermined threshold TH2, the latency monitoring module 103a in the router 102a notifies the network monitoring server 118 of the increase in latency via the management line 151.

In FIG. 6, the processing latency 1001 viewed from the client terminal 104a in the client site 101a is the time T8–T1 observed at the router 102a in the client site 101a. The processing latency 1002 in the data center 110 is the time T7–T2. The processing latency (or the processing time) 1003 in the application server 115a is the time T6–T3. The processing latency (or the processing time) 1004 in the OS 261-1 is the time T5–T4. The latency 1005 caused by communication via the WAN 150, which is observed at the client terminal 104a in the client site 101a, is the time T8–T1–T7+T2.

As described above, at the router 102a in the client site 101a, the processing latency 1001 viewed from the client site 101a is monitored with the threshold TH2, and at the router 120 in the data center 110, the processing latency 1002 in the data center 110 is monitored with the threshold TH1. When either of the processing latencies exceeds the threshold TH1 or TH2, the relevant router 102a or 120 notifies the network monitoring server 118 of the increase in processing latency together with the destination IP address.

Although FIG. 6 illustrates an example using the client terminal 104a in the client site 101a, the examples using the client sites 101b and 101c are the same.

Figure 7:
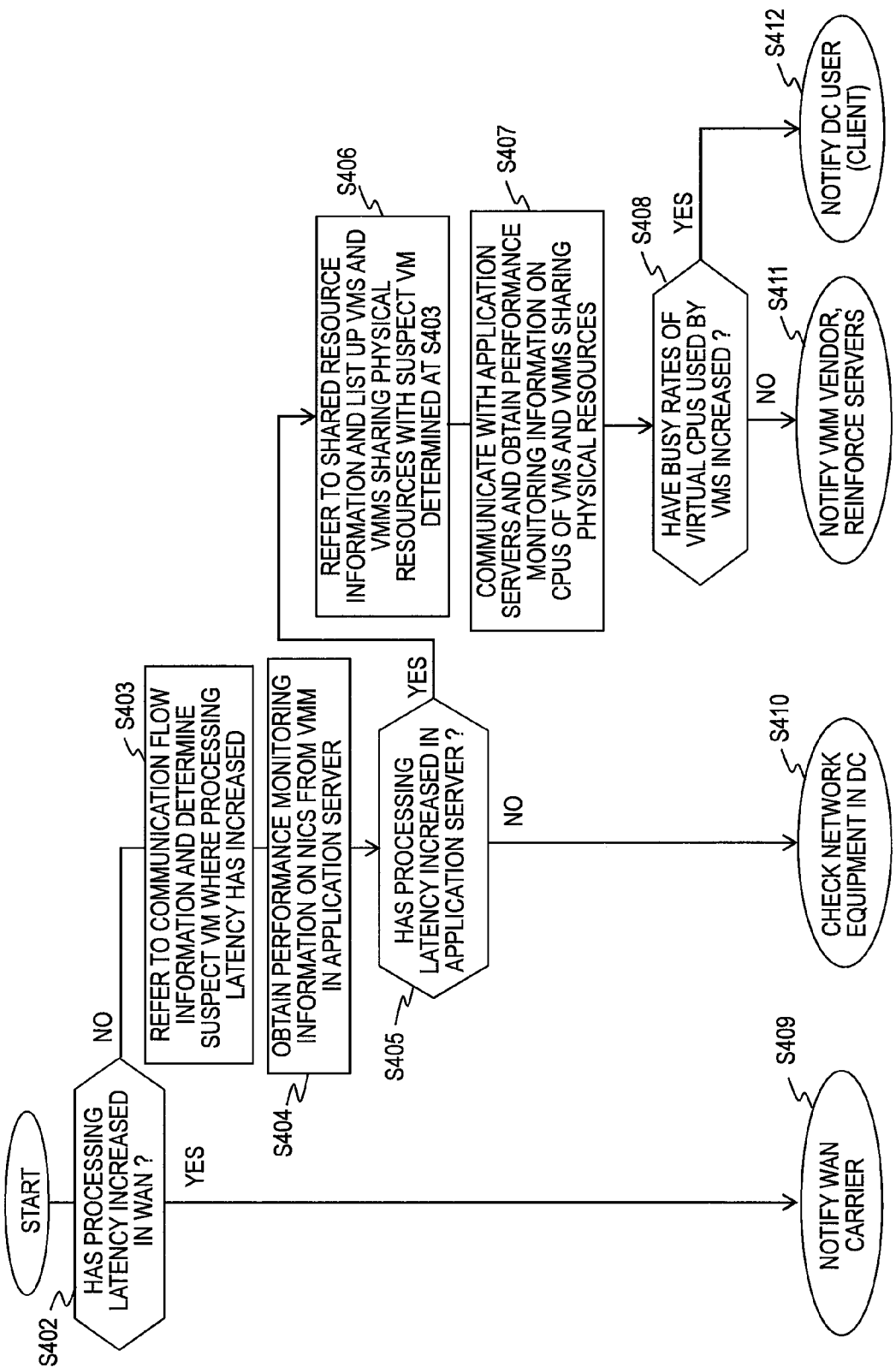
FIG. 7 shows the first embodiment of this invention, is a flowchart exemplifying a procedure executed in the network monitoring server.

FIG. 7 is a flowchart exemplifying a procedure executed in the network monitoring server 118. This procedure starts when the information collection range determination module 304 in the network monitoring server 118 receives a delay notice 312 from any one of the routers 102a to 102c in the client sites 101a to 101c and the router 120 in the data center 110.

At step S402, the information collection range determination module 304 determines whether the part which has developed the increase in processing latency is the WAN 150 or not. At this determination step, the information collection range determination module 304 determines which of the routers 102a to 102c in the client site 101 and the router 120 in the data center 110 has sent the delay notice 312 with reference to the identifier. If the delay notice 312 is from any of the routers 102a to 102c in the client site 101, the information collection range determination module 304 determines that the WAN has developed the increase in latency and proceeds to step S409. At the step S409, the information collection range determination module 304 notifies the source locator module 306 that the part which has developed the increase in processing latency is the WAN 150. The source locator module 306 notifies the network monitoring terminal 119 that the WAN 150 has developed an increase in processing latency in a system performance degradation source notice 314. The network monitoring terminal 119 which has received the system performance degradation source notice 314 displays on its monitor (not shown) that the latency has increased because of some fault in the WAN 150.

On the other hand, if the information collection range determination module 304 has received the delay notice 312 from the router 120 in the data center 110 or from both of the router 120 in the data center 110 and a router 102 in a client site 101, the procedure proceeds to step S403 to locate the source of the increase in latency in the data center 110.

At the step S403, the information collection range determination module 304 in the network monitoring server 118 searches the communication flow information 301 with the IP address included in the delay notice 312, refers to the application server number 502 and the VM number 503 corresponding to the destination IP address 501 to locate the application server 115x and the virtual machine 212-y as the parts which have developed the increase in processing latency.

At step S404, the network monitoring server 118 obtains performance monitoring information from the suspect application server 115x and the suspect virtual machine 212-y to locate the part which has caused the increase in latency. In this process, the information collection range determination module 304 instructs the information acquisition command module 305 to obtain the performance monitoring information on the NICs of the suspect application server 115x and the suspect virtual machine 212-y. The information acquisition command module 305 sends a performance monitoring information acquisition request 313 that requests performance monitoring information on the NICs to the information clipper 251 in the designated suspect application server 115x. In the suspect application server 115x, the information clipper 251 obtains the NIC performance statistics 243 and returns it as the performance monitoring information notice 252 to the network monitoring server 118.

Upon receipt of the performance monitoring information notice 252 on the NICs from the application server 115x, the network monitoring server 118 determines whether the processing latency has increased at the NICs (physical NICs 221 and the virtual NICs) in the application server 115x at step S405. This determination is made at the source locator module 306. If the NIC performance monitoring information in the performance monitoring information notice 252 includes data (packets) whose latencies are above a predetermined threshold value or data whose data transmission rates are below a predetermined threshold value, the source locator module 306 determines that the NICs in the suspect application server 115x or the virtual machine 212-y have developed an increase in processing latency and proceeds to step S406. On the other hand, if the NIC performance monitoring information does not indicate that the processing latency has increased, the source locator module 306 proceeds to step S410.

At the step S410, the source locator module 306 determines that the business network within the data center 110 has developed a fault because it has determined that there is no source of the increase in processing latency in the suspect application server 115x and the processing latency has increased at the router 120 in the data center 110. The source locator module 306 notifies the network monitoring terminal 119 that the business network in the data center 110 might have developed a fault in a system performance degradation source notice 314. The network monitoring terminal 119 which has received the system performance degradation source notice 314 displays on its monitor (not shown) that latency has increased because of some fault in the business network in the data center 110.

At the step S406, the source locator module 306 continues to locate the source of the increase in latency since the NICs in the suspect application server 115x or the suspect virtual machine 212-y has developed an increase in latency. To locate the source of the increase in latency, the information collection range determination module 304 refers to the shared resource information 302 to extract the virtualization module 211 and the virtual machines sharing physical computer resources with the suspect virtual machine 212-y.

At step S407, the information collection range determination module 304 instructs the information acquisition command module 305 to obtain performance monitoring information on the CPUs from the application servers 115 implementing the virtualization module 211 and the virtual machines 212 which shares physical computer resources with the suspect virtual machine 212-y and have been extracted at the step S406. The information acquisition command module 305 sends a performance monitoring information acquisition request 313 to the suspect application server 115x to request CPU performance monitoring information of the extracted virtualization module 211 and the virtual machines 212.

The information clipper 251 in the application servers 115 obtains CPU performance statistics 244 responsive to the performance monitoring information acquisition request 313 and returns it as the performance monitoring information notice 252 to the network monitoring server 118.

Upon receipt of the CPU performance information monitoring information notice 252 from the application servers 115x, the network monitoring server 118 determines whether the utilization rate of the virtual CPU allocated to the virtual machine 212-y in the application server 115x has increased or not at step S408. This determination is made at the source locator module 306. The source locator module 306 extracts the utilization rates of the virtual CPU of the suspect virtual machine 212-y and the utilization rates of the virtual CPUs of the other virtual machines 212 sharing the computer resources with the suspect virtual machine 212-y from the CPU performance monitoring information in the performance monitoring information notice 252 to determine whether the utilization rates of those virtual CPUs have increased or not. This determination process may sequentially compare the utilization rates of the virtual CPUs to detect an increase in the utilization rates. Alternatively, if a virtual CPU utilization rate is above a predetermined threshold (for example, 90%), it may determine that the CPU utilization rate has increased.

If the source locator module 306 determines that the virtual CPU utilization rates have increased as they are above the predetermined threshold, it proceeds to step S412 and notifies the network monitoring terminal 119 that the business application 262 in the virtual machines 212 have developed a fault or an error to cause an increase in processing latency in a system performance degradation source notice 314. The network monitoring terminal 119 displays a notice of a fault in the business applications 262 running on the virtual machine 212-y on its monitor (not shown) in accordance with the system performance degradation source notice 314 from the network monitoring server 118 and recommends to inform the clients operating and managing the business applications 262.

On the other hand, if the source locator module 306 determines that the virtual CPU utilization rates have not increased, it proceeds to step S411. Then, it determines that the virtualization module 211 operating the virtual machines 212 has developed a fault to cause the increase in processing latency and notifies the network monitoring terminal 119 in a system performance degradation source notice 314. In other words, if the virtual CPU utilization rates do not rise and the processing latency has increased in the application server 115x, the virtualization module 211 or the hardware resources 210 in the application server 115x might have developed a fault. Therefore, the network monitoring terminal 119 that has received a system performance degradation source notice 314 from the network monitoring server 118 displays a warning on the not shown monitor to recommend the administrator of the data center 110 to inform the vendor of the virtualization module 211 or to consider reinforcement of the application server 115x.

Through the above-described operations, the router 102 in the client site 101 and the router 120 in the data center 110 monitor the latency in only the communications with predetermined destination IP addresses, and upon detection of an increase in latency, they notify the network monitoring server 118 of it in a delay notice 312 with the relevant IP addresses. Upon receipt of the delay notice 312, the network monitoring server 118 determines whether or not the WAN 150 has developed a fault. If not, the network monitoring server 118 refers to the IP addresses included in the delay notice 312 and locates the suspect application server 115x and the suspect virtual machine 212-y as the parts which have developed the increase in latency. The network monitoring server 118 collects performance monitoring information on NICs in these suspects (the parts which might have developed the increase in latency) and determines whether the source of the increase in latency is the business network in the data center 110 or not. If the source of the increase in latency is not the business network, the network monitoring server 118 includes the resources that share physical computer resources with the suspect virtual machine 212-y in the suspects to determine which is the source of the increase in latency, the virtualization module 211 or the business applications 262 on the virtual machine 212-y.

The network monitoring server 118 locates the part which has caused the increase in latency as described above and notifies the network monitoring terminal 119, which displays the parts which have developed increase in latency on its monitor. The administrator using the network monitoring terminal 119 can immediately decide the person to whom he should instruct to fix the fault depending on the located source of the increase in latency.

The above-described method monitors only the communications actually using the business applications 262, narrows the parts which might have developed an increase in latency in the data center 110 from the destination IP address 501 of the communication, obtains performance monitoring information from the application server 115x and the virtual machine 212-y found by narrowing, and locates the part which has developed the increase in latency. Furthermore, the method obtains the performance monitoring information on the parts (physical computers, the virtualization module 211, and other virtual machines 212) that share physical computer resources with the suspect virtual machine 212-y and locates the part which has caused the increase in latency.

Unlike the previously described conventional techniques, the method does not require the network monitoring server 118 to collect performance monitoring information on all of the application servers 115 and the virtual machines 212. The method can reduce the significant amount of data of the performance monitoring information to be obtained to locate the part which has developed an increase in latency and the part which has caused the increase in latency compared with the conventional techniques. The method can promptly locate the part which has developed an increase in latency, and further, the part which has caused the increase in latency.

The method enables detection of faults in the WAN 150 that configures cloud computing, the equipment that configures the business network in the data center, a virtualization module 211 on an application server 115, and virtual machines 212 running on the virtualization module 211 and prompt location of the source of degradation in throughput (system performance), achieving highly reliable services.

Figure 8:
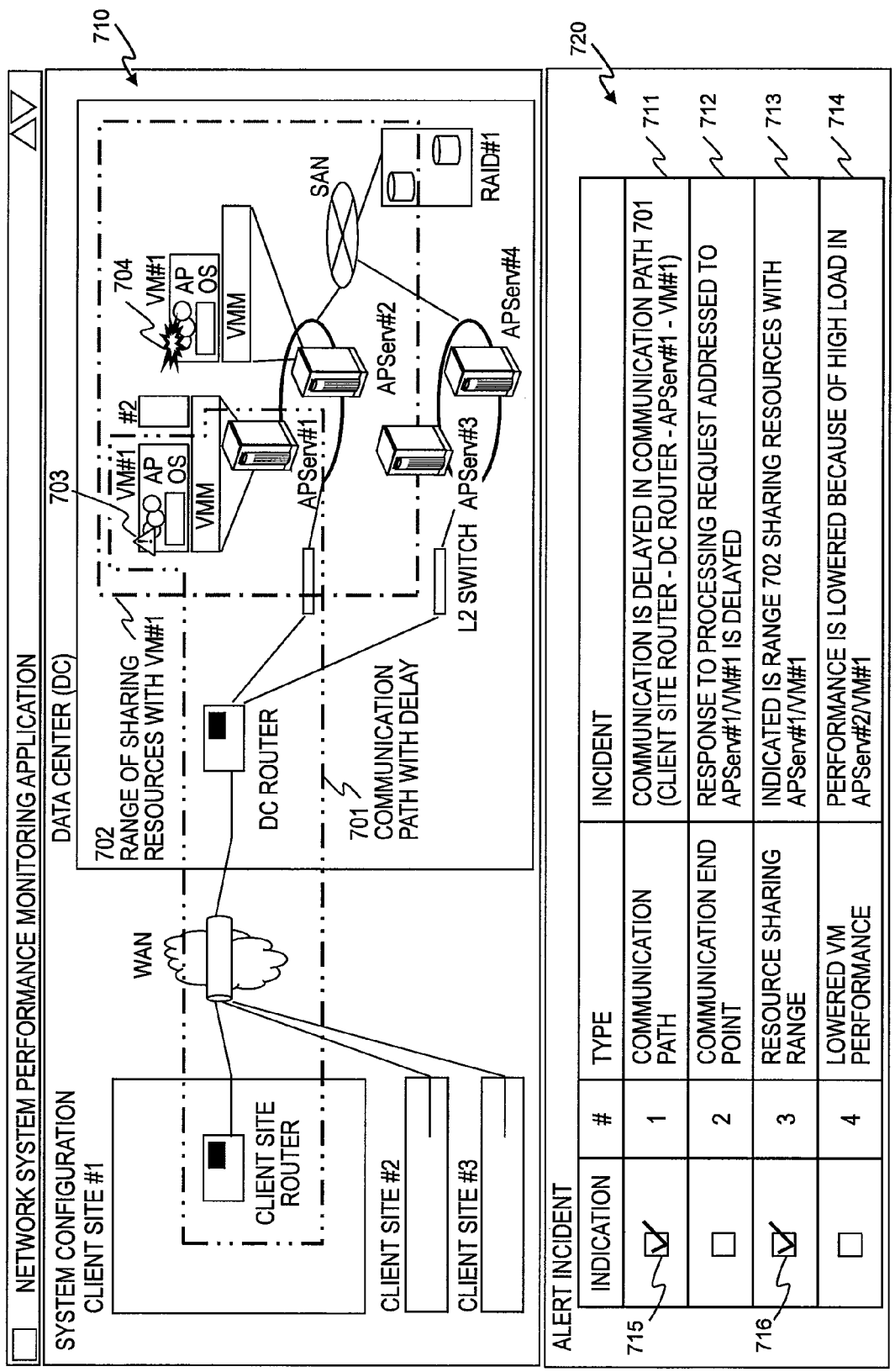
FIG. 8 shows the first embodiment of this invention, is a screen image showing an example of an interface that displays the part which has developed an increase in latency on the monitor.

FIG. 8 is a screen image showing an example of an interface that displays the part which has developed an increase in latency on the monitor of the network monitoring terminal 119.

The interface of the network monitoring terminal 119 is generally separated into two: an area 710 for indicating the configuration of the computer system and an area 720 for indicating a system performance degradation source notice 314. In the area 710, a communication path 701 where an increase in latency has been detected is indicated by being surrounded by a two-dot chain line. In the area 710, the virtual machine (VM#1) is displayed with an alert icon 703 as the part where the increase in latency has been detected through the procedure described with reference to FIG. 7. Furthermore, in the area 710, another virtual machine (VM#1) is displayed with an icon 704 indicating a trouble as the part which has been determined to be the source of the increase in latency through the procedure in FIG. 7. In the area 710, the components 702 sharing physical computer resources with the virtual machine (VM#1) where the increase in latency has been detected are indicated by being surrounded by a one-dot chain line.

The area 720 for indicating a system performance degradation source notice 314 is composed of four types of increase in latency by way of example: the region of communication path 711, the region of communication end point 712, the region of shared resource range 713, and the region of VM performance degradation 714. The sources included in the system performance degradation source notice 314 are indicated with check marks 715 and 716.

In FIG. 8, the check marks 715 and 716 are set at the region of communication path 711 and the region of shared resource range 713. The alert incidents for the regions 711 and 713 indicate text messages corresponding to the relevant parts in the area 710. The alert incident for the region 711 indicates that the communication path 701 has developed an increase in latency and the alert incident for the region 713 indicates that the range of components 702 sharing computer resources with the application server (APServ#1) and the virtual machine (VM#1) determined to be the parts which have developed an increase in latency.

The administrator of the data center 110 can swiftly and easily learn the part which has developed an increase in latency by an alert and a warning in the area 710 graphically showing the configuration of the computer system and detailed indications in text in the area 720.

Figure 9:
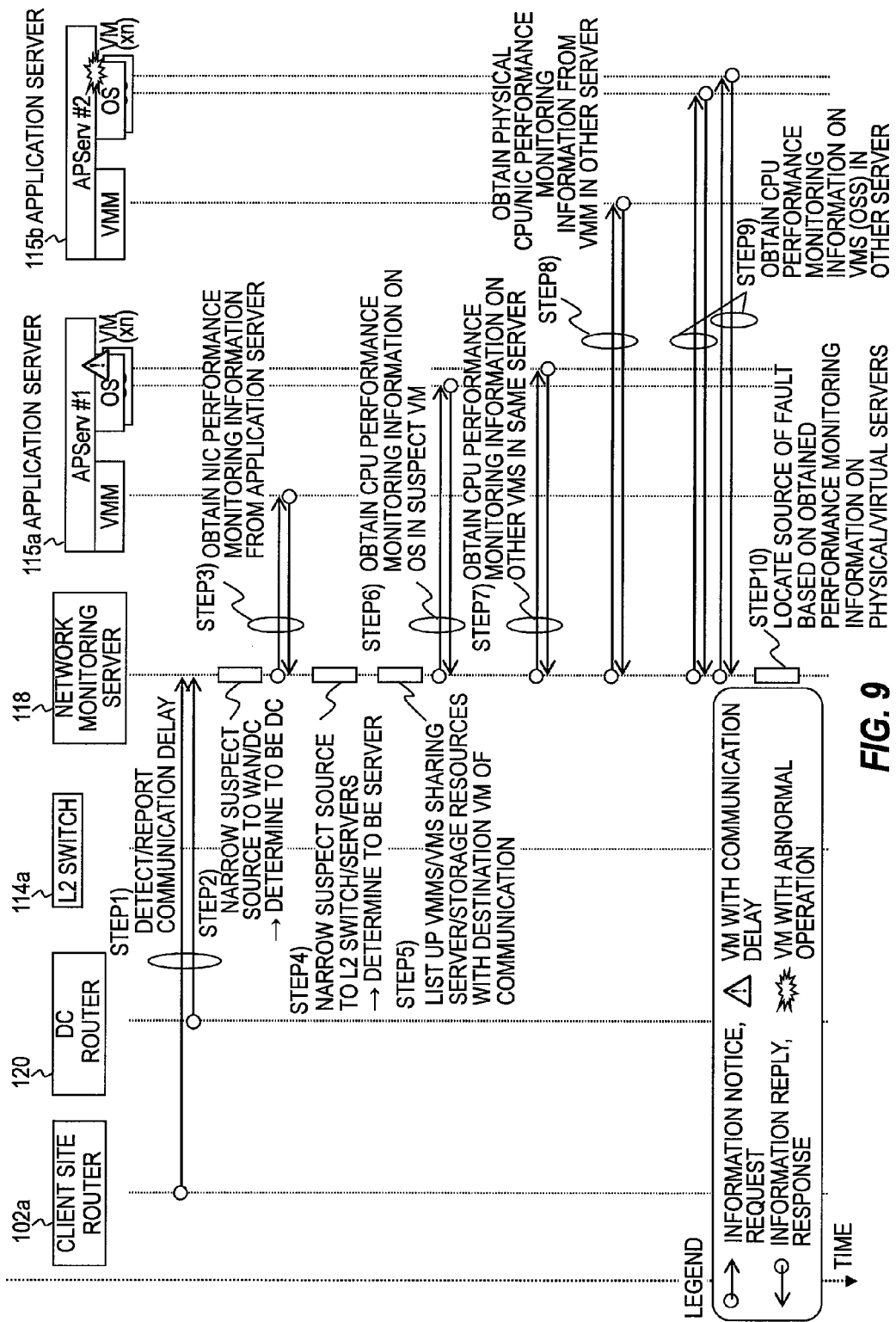
FIG. 9 shows the first embodiment of this invention, is a sequence diagram of a procedure to locate the part which has developed an increase in latency shown in FIG. 8

FIG. 9 is a sequence diagram of a procedure to locate the part which has developed an increase in latency shown in FIG. 8.

At step 1, the network monitoring server 118 receives delay notices 312 from the router 102a in the client site 101a and the router 120 in the data center 110.

At step 2, the network monitoring server 118 determines which the part that has developed an increase in latency is, the WAN 150 or the data center 110. This process is the step S402 in FIG. 7. Since both of the router 102a in the client site 101a and the router 120 in the data center 110 detect an increase in latency in this example, the network monitoring server 118 determines that the source of the increase in latency is in the data center 110. The network monitoring server 118 locates the suspects of the parts which have developed the increase in latency is the application server 115a and the virtual machine 212-1 (VM#1) from the IP address included in the delay notices 312 from the routers. This process is the step S403 in FIG. 7.

At step 3, the network monitoring server 118 obtains performance monitoring information on NICs from the suspect application server 115a. This process is the step S404 in FIG. 7.

At step 4, the network monitoring server 118 determines which the source of the increase in latency is, the business network or the application server 115a, from the obtained NIC performance monitoring information. This process is step S405 in FIG. 7. Since the network monitoring server 118 detects system performance degradation in the NIC performance monitoring information in this example, it determines that the source of the increase in latency is the application server 115a.

At step 5, the network monitoring server 118 refers to the shared resource information 302 and extracts the virtualization module 211 and other virtual machines 212 with which the suspect virtual machine 212-1 shares physical computer resources. This process is the step S406 in FIG. 7. In this example, the suspect virtual machine 212-1 shares an LU in the storage apparatus 116 with the virtual machine 212 in the application server 115b.

At step 6, the network monitoring server 118 obtains performance monitoring information on the CPUs of the virtualization module 211 and the virtual machine 212-1 in the suspect application server 115a, and at step 7, it obtains performance monitoring information on the CPUs of the other virtual machines in the application server 115a in which the suspect virtual machine 212-1 is implemented. At steps 8 and 9, the network monitoring server 118 obtains performance monitoring information on the CPUs of the virtualization module 211 and the virtual machine 212 in the application server 115b with which the suspect virtual machine 212-1 shares physical computer resources. These processes are the step S407 in FIG. 7.

At step 10, the network monitoring server 118 detects that the virtual CPU utilization rate in the virtual machine (VM#1) in the application server 115b has increased from the above-described obtained CPU performance monitoring information and locates the part which has caused the increase in latency at this virtual machine.

In this way, the network monitoring server 118 detects increases in processing latency at the routers in the client site 101 and the data center 110 from communications actually using the business applications 262 and locates the application server (physical computer) 115 and the virtual machine (virtual computer) 212 which have developed an increase in processing latency from the destination address (destination IP address 501) included in the communication in which a delay has been detected.

The network monitoring server 118 additionally obtains CPU performance monitoring information from the virtual machines 212 and other application servers 115 sharing physical computer resources with the suspect virtual machine 212-y. This leads to the determination that the virtual machine #VM1 in the application server 115b is the source of the increase in latency.

In this example, the virtual machine VM#1 in the application server 115a (APServ#1) and the virtual machine VM#1 in the application server 115b (APServ#2) share an LU in the storage apparatus 116. Although the part where the router has detected increase in latency is the virtual machine VM#1 in the application server APServ#1, it can be supposed that the virtual machine VM#1 in the application server APServ#2 sharing an LU in the storage apparatus 116 has developed a fault to cause the delay in accessing by the virtual machine VM#1 in the application server APServ#1. Besides, the administrator of the storage apparatus 116 in the data center 110 is provided with an opportunity to check whether the LU shared by the virtual machines 212 of the application servers APServ#1 and APServ#2 is failed or not.

In this way, this invention achieves location of the virtual machine 212-y from which an increase in processing latency has been detected and the virtual machine VM#1 (APServ#2) which has actually developed a fault.

Figure 10A:
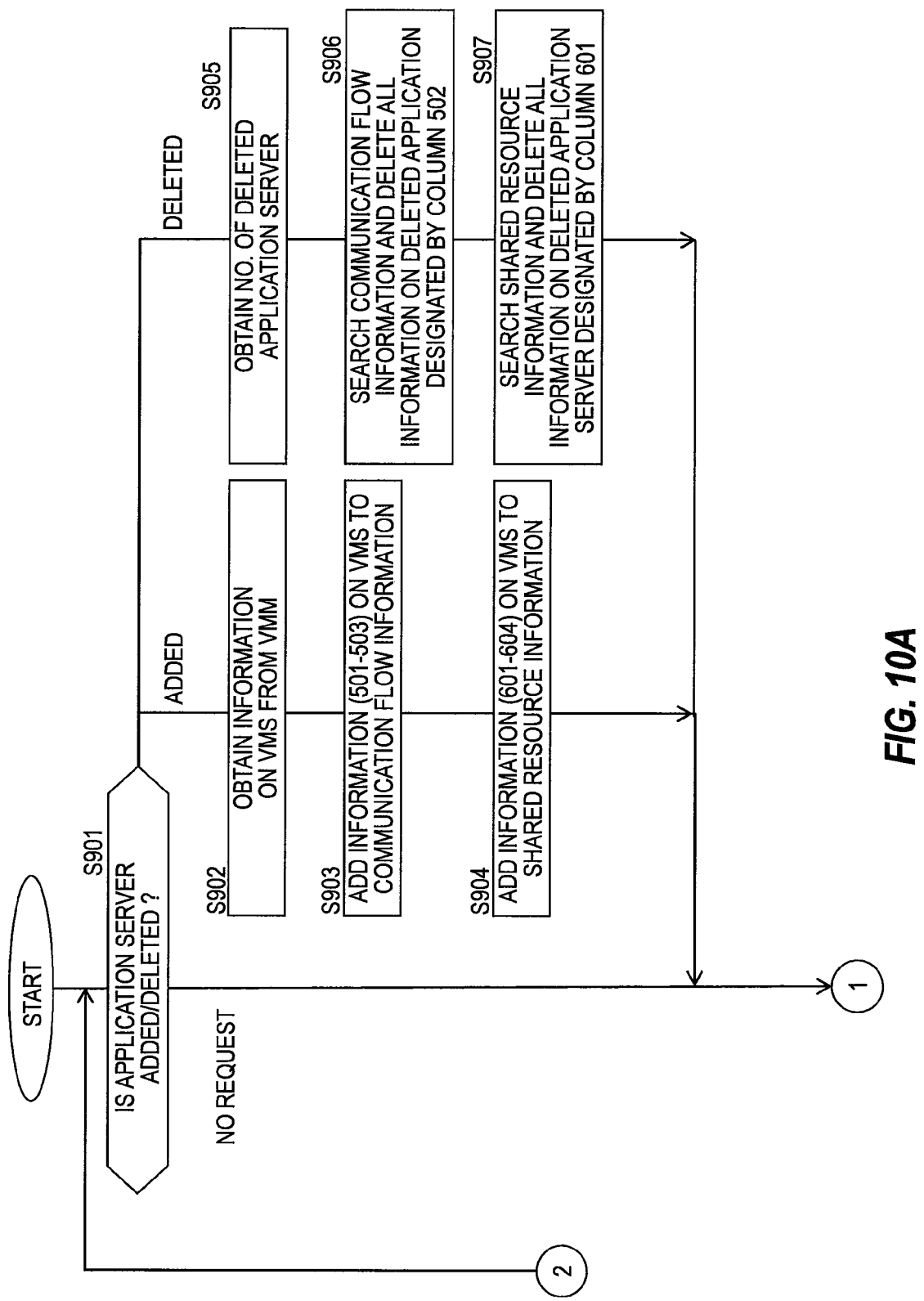
FIG. 10A and FIG. 10B show the first embodiment of this invention, are flowcharts illustrating an example of a procedure to be performed by the application server monitoring module 321, the VM monitoring module 322, and the information update module 323 in the network monitoring server.
Figure 10B:
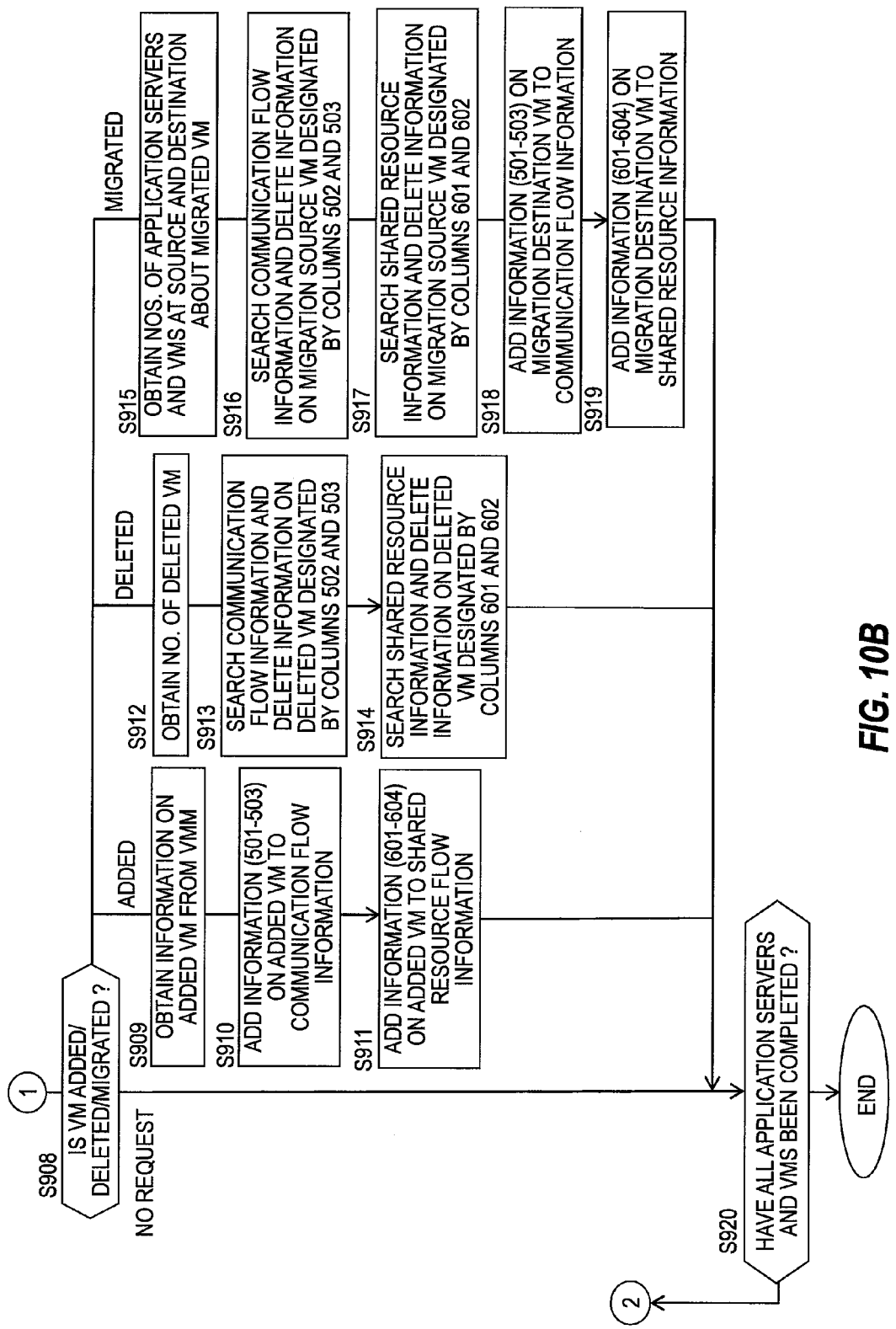

FIG. 10A and FIG. 10B are flowcharts illustrating an example of a procedure to be performed by the application server monitoring module 321, the VM monitoring module 322, and the information update module 323 in the network monitoring server 118. This procedure starts when the network monitoring server 118 receives a change notice 331 (for addition or deletion) of an application server or a change notice 332 (for addition, migration, or deletion) of a virtual machine from the virtualization management server 130.

The steps S901 to S907 in FIG. 10A correspond to the processes for the application server monitoring module 321 and the information update module 323 and the steps S908 to S919 in FIG. 10B correspond to the processes for the VM monitoring module 322 and the information update module 323.

At the step S901, the application server monitoring module 321 determines whether it has received an application server change notice 331 or not. If it has not received an application server change notice 331, the procedure proceeds to step S908 in FIG. 10B. If the application server change notice 331 indicates the addition of an application server 115, the procedure proceeds to step S902, and if it indicates the deletion, the procedure proceeds to step S905.

At the step S902, the application server monitoring module 321 finds the added application server 115 from the application server change notice 331 and obtains information on virtual machines 212 defined by the virtualization module 211 in the added application server 115.

At step S903, the application server monitoring module 321 sets the IP addresses of the virtual machines 212, the identifiers (numbers) of the virtual machines 212, and the identifier (number) of the application server 115 to the communication flow information 301.

At step S904, the application server monitoring module 321 sets information on computer resources shared by the virtual machines 212 obtained from the application server 115 to the shared resource information 302.

Through the above-described steps S902 to S904, with respect to an application server 115 added in the application server change notice 331 received by the network monitoring server 118, the destination IP addresses 501 and other information on the virtual machines 212 to be monitored by routers are added to the communication flow information 301 and information on computer resources to be shared by the virtual machines 212 in the added application server 115 is added to the shared resource information 302.

At step S905, the application server monitoring module 321 obtains the identifier (number) of a deleted application server 115 from the application server change notice 331.

At step S906, the application server monitoring module 321 searches the communication flow information 301 for entries including the application server number 502 corresponding to the identifier of the deleted application server 115 and deletes the entries.

At step S907, the application server monitoring module 321 searches the shared resource information 302 for entries including the application server number 601 corresponding to the identifier of the deleted application server 115 and deletes the entries.

Through the above-described steps S905 to S907, the network monitoring server 118 deletes information on a deleted application server 115 included in the received application server change notice 331 from the communication flow information 301 and the shared resource information 302.

If the application server monitoring module 321 has not received an application server change notice 331, it determines whether the VM monitoring module 322 has received a virtual machine change notice 332 at step S908 in FIG. 10B. If it does not receive a virtual machine change notice 332, the procedure proceeds to step S920. On the other hand, if the virtual machine change notice 332 indicates addition of a virtual machine 212, the procedure proceeds to step S909; if it indicates deletion, the procedure proceeds to step S912; and if it indicates migration, the procedure proceeds to step S915.

At the step S909, the virtual machine monitoring module 322 finds the virtual machine 212 added in the virtual machine change notice 332 and the application server 115 on which the added virtual machine 212 runs with their identifiers, and obtains information on the added virtual machine 212 from the virtualization module 211 in the application server 115.

At step S910, the VM monitoring module 322 adds the IP address, the identifier (number) of the virtual machine 212, and the identifier (number) of the application server 115 obtained from the application server 115 to the communication flow information 301.

At step S911, the VM monitoring module 322 adds information on computer resources shared with other virtual machines 212 from the information on the virtual machine 212 obtained from the application server 115 to the shared resource information 302.

Through the above-described steps S909 to S911, with respect to an added virtual machine 212 indicated in the application virtual machine change notice 332 received by the network monitoring server 118, the IP addresses 501 and other information to be monitored by the routers are added to the communication flow information 301 and information about computer resources to be shared by the added virtual machine 212 are added to the shared resource information 302.

Next, at step S912, the virtual machine monitoring module 322 obtains the identifiers of the virtual machine 212 deleted in the virtual machine change notice 332 and the application server 115 on which the deleted virtual machine 212 runs.

At step S913, the virtual machine monitoring module 322 searches the communication flow information 301 for the entry including the application server number 502 and the virtual machine number 503 corresponding to the identifiers of the application server 115 and the virtual machine 212, and deletes the entry.

At step S914, the virtual machine monitoring module 322 searches the shared resource information 302 for the entry including the application server number 601 and the virtual machine number 602 corresponding to the identifiers of the application server 115 and the virtual machine 212, and deletes the entry.

Through the above-described steps S912 to S914, the network monitoring server 118 deletes information on a deleted virtual machine 212 included in the received virtual machine change notice 332 from the communication flow information 301 and the shared resource information 302.

Next, at step S915, the virtual machine monitoring module 322 obtains the identifiers of the virtual machine 212 migrated in the virtual machine change notice 332 and the application servers 115 on which the migrated virtual machine 212 runs. These identifiers include the identifiers of the virtual machine and the application server of the migration source and the identifiers of the virtual machine and the application server of the migration destination.

At step S916, the virtual machine monitoring module 322 searches the communication flow information 301 for the entry including the application server number 502 and the virtual machine number 503 corresponding to the identifiers of the application server 115 and the virtual machine 212 of the migration source, and deletes the entry.

At step S917, the virtual machine monitoring module 322 searches the shared resource information 302 for the entry including the application server number 601 and the virtual machine number 602 corresponding to the identifiers of the application server 115 and the virtual machine 212 of the migration source, and deletes the entry.

Through the above-described steps S916 to S917, with respect to a migrated virtual machine 212 included in the received virtual machine change notice 332, the network monitoring server 118 deletes information on the virtual machine 212 of the migration source from the communication flow information 301 and the shared resource information 302.

At step S918, the VM monitoring module 322 obtains the IP address and the identifier (number) of the virtual machine 212 of the migration destination, the identifier of the application server, the identifiers of computer resources shared by the virtual machine of the migration destination with other virtual machines from the virtualization module 211 of the application server 115 of the migration destination indicated in the virtual machine change notice 332. Then, the VM monitoring module 322 adds the IP address and the identifier (number) of the virtual machine 212 of the migration destination, and the identifier (number) of the application server 115 to the communication flow information 301.

At step S919, the VM monitoring module 322 adds identifiers of the computer resources shared with other virtual machines obtained from the application server 115 which implements the virtual machine 212 of the migration destination to the shared resource information 302.

Through the above-described steps S915 to S919, the network monitoring server 118 updates the communication flow information 301 and the shared resource information 302 by rewriting the information on the migration source to the information on the migration destination with respect to a virtual machine migrated in the received virtual machine change notice 332.

Next, at step S920, the network monitoring server 118 determines whether operations on all of the virtual machines 212 included in the application server change notice 331 or the virtual machine change notice 332 have been completed or not. If unprocessed virtual machine 212 is left, the procedure returns to the step S901 and repeats the above operations. On the other hand, all of the virtual machines 212 have been processed, the procedure ends the flowchart.

If application servers 115 or virtual machines 212 are changed in the data center 110, the network monitoring server 118 updates the communication flow information 301 and the shared resource information 302 through the above-described procedure. The network monitoring server 118 transmits the updated communication flow information 301 to the routers 102 in the client sites 101 and the router 120 in the data center 110 to make them update the communication to be monitored.

As set forth above, upon change in configuration of application servers 115 and virtual machines 212, this embodiment updates the communication flow information 301 and the shared resource information 302, so that the latest monitoring conditions can always be set to the routers 102 and 120.

Upon receipt of a delay notice 312 from the latency monitoring modules 103 and 121 in the routers 102 and 120, the network monitoring server 118 refers to the communication flow information 301 to determine the application server 115x and the virtual machine 212-y where the latency has increased to be the suspects. Then, the network monitoring server 118 obtains performance monitoring information on physical computer resources (CPU and NICs) and performance monitoring information on virtual computer resources (virtual CPUs and virtual NICs) from the virtualization module 211 of the suspect application server to locate the source of the increase in latency. Moreover, the network monitoring server 118 obtains performance monitoring information on physical computer resources and performance monitoring information on virtual computer resources from the virtualization modules 211 of other virtual machines that share physical computer resources with the suspect virtual machine 212-y to locate the source of the increase in latency.

Through these operations, the network monitoring server 118 can quickly and accurately locate the source of the increase in latency out of the WAN 150, the business network in the data center 110, the application servers 115, and the business applications 262.

Second Embodiment

Figure 11:
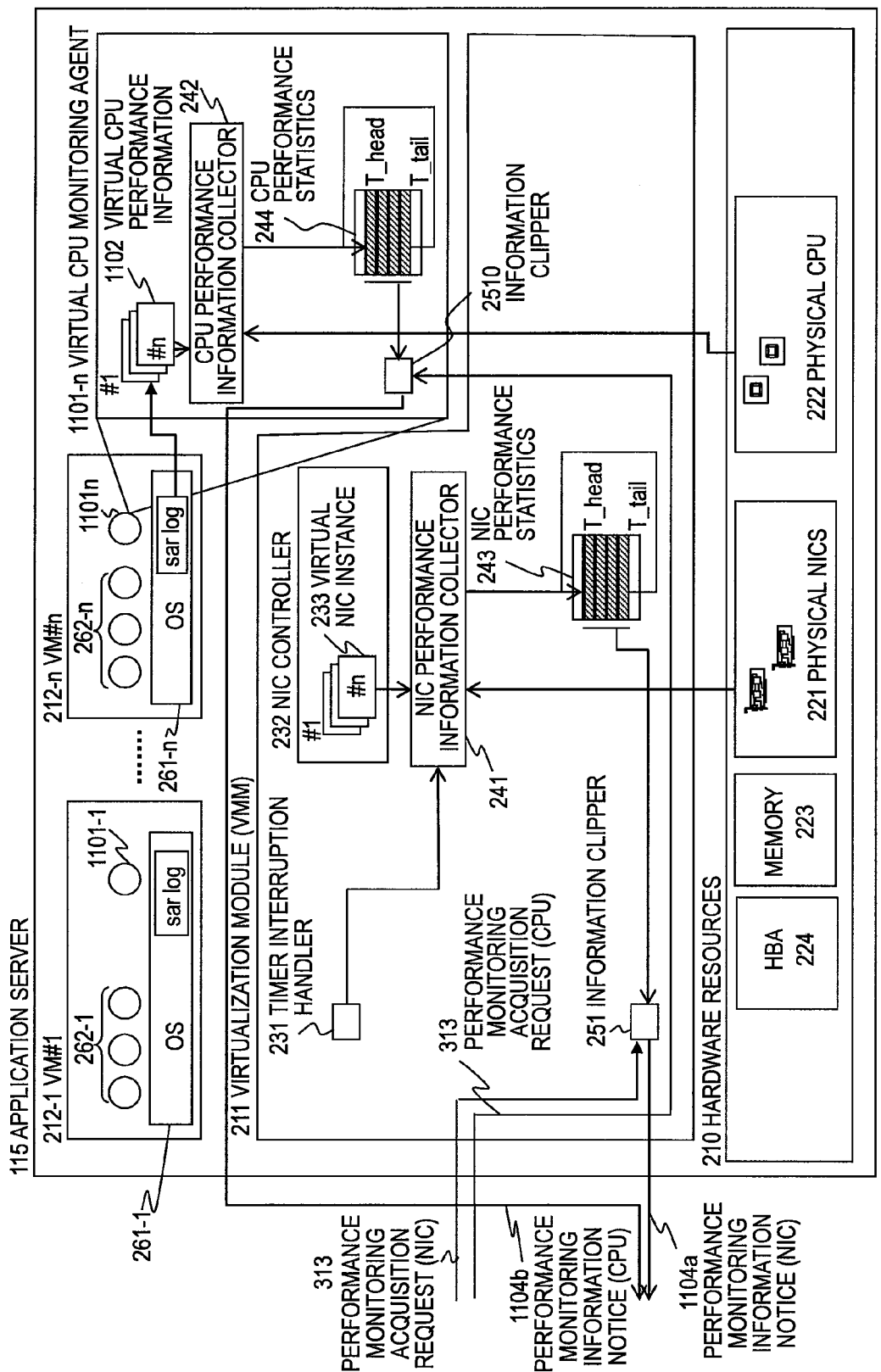
FIG. 11 is a block diagram of an application server 115 to illustrate a second embodiment.

FIG. 11 is a block diagram of an application server 115 to illustrate a second embodiment. The application server 115 in the second embodiment includes a virtual CPU agent to be implemented on an OS 261 in a virtual machine 212, which is a replacement of the CPU performance information collector 242 in the virtualization module 211 in the first embodiment and is a modified example where the CPU performance information collector 242 in the first embodiment has been moved from the virtualization module 211 to the OS 261. The other configurations are the same as that of the first embodiment.

In the second embodiment, on the OSs 261-1 to 261-n in the virtual machines 212-1 to 212-n, business applications 262-1 to 262-n in the first embodiment run, and additionally, virtual CPU monitoring agents 1101-1 to 1101-n are implemented. Since the virtual CPU monitoring agents 1101-1 to 1101-n have the same configuration, only the shown virtual CPU monitoring agent 1101-n will be explained hereinbelow. The virtual machines 212-1 to 212-n and the OS 261-1 to 261-n are generically designated as virtual machines 212 and OSs 261, respectively.

The virtual CPU monitoring agent 1101-n includes a CPU performance information collector 242 for collecting performance monitoring information on the virtual CPU allocated to the OS 261-n in the virtual machines 212-n, CPU performance statistics 244 for storing collected performance monitoring information on virtual CPUs, and an information clipper 2510 that obtains the CPU performance statistics 244 in accordance with an instruction in the performance monitoring acquisition request 313 and send it to the network monitoring server 118 as a performance monitoring information notice 1104b.

The CPU performance information collector 242 obtains performance monitoring information (for example, CPU utilization rates) on the virtual CPU in a predetermined cycle (for example, 10 msec). The performance monitoring information on the virtual CPU may be obtained through the OS 261 or from log of the OS 261 (sar log in FIG. 11).

The CPU performance information collector 242 then stores the obtained performance monitoring information on the virtual CPU in the CPU performance statistics 244. The CPU performance statistics 244 may include the time stamps of the collected performance monitoring information. In the CPU performance statistics 244, performance monitoring information on the virtual CPU during a predetermined period (for example, for 10 minutes or 20 minutes) is stored in a predetermined cycle, like in the first embodiment.

When the network monitoring server 118 transmits a performance monitoring information acquisition request 313, the application server 115 receives it at the information clipper 251 or the information clipper 2510. If the performance monitoring information acquisition request 313 designates NICs as a collection target, the information clipper 251 sends the NIC performance statistics 243 as a performance monitoring information notice 1104a to the network monitoring server 118, like in the first embodiment. If the performance monitoring information acquisition request 313 designates a CPU as a collection target, the information clipper 2510 instructs to send performance monitoring information on the CPU. The information clipper 2510 in the virtual machine 212 which has received the instruction sends the CPU performance statistics 244 as a performance monitoring information notice 1104b to the network monitoring server 118.

In each virtual machines 212-n to 212-n, each virtual CPU agent 1101-1 to 1101-n obtains performance monitoring information on the virtual CPU and stores it in the CPU performance statistics 244. The network monitoring server 118 designates a virtual machine 212 from which performance monitoring information on the CPU is to be obtained with the identifier in the performance monitoring information acquisition request 313 to notify the information clipper 2510 in the virtual machine 212 in the application server 115. The virtual CPU agent 1101 in the virtual machine 212 responds to the request by sending the CPU performance statistics 244 through the information clipper 2510.

As described above, the configuration in which each virtual machine 212 includes each virtual CPU agent 1101-1 to 1101-n enables the network monitoring server 118 to obtain performance monitoring information on the CPU of the designated virtual machine 212 only. As to the performance monitoring information on a physical CPU 222, a performance information collector dedicated to the physical CPU may be provided in the virtualization module 211.

In this second embodiment, like in the first embodiment, the network monitoring server 118 monitors the latency in the communications actually using business applications 262 only and locates the part which has developed an increase in latency (the application server 115x and the virtual machine 212-y) in the data center 110 from the destination IP address 501. Moreover, the network monitoring server 118 obtains performance monitoring information on the parts which share physical computer resources (the physical computer, the virtualization module 211, and other virtual machines 212) with the suspect virtual machine 212-y to locate the part which has caused the increase in latency (performance degraded part).

In the second embodiment, an example has been described in which, upon transmission of a performance monitoring information request 313 from the network monitoring server 118, the information clipper 251 or 2510 in the application server receives the request. However, the information clipper 251 may transfer the performance monitoring information acquisition request 313 to the information clipper 2510. In other words, if the performance monitoring information acquisition request 313 is for a CPU, the information clipper 251 instructs the information clipper 2510 in the designated virtual machine 212 to send the CPU performance information. The information clipper 2510 in the virtual machine 212 which has received the instruction sends the CPU performance statistics 244 as a performance monitoring information notice 1104b to the network monitoring server 118. If the performance monitoring information acquisition request 313 is for NICs, the information clipper 251 sends the NIC performance statistics 243 as a performance monitoring information notice 1104a to the network monitoring server 118, like in the first embodiment.

Third Embodiment

Figure 12:
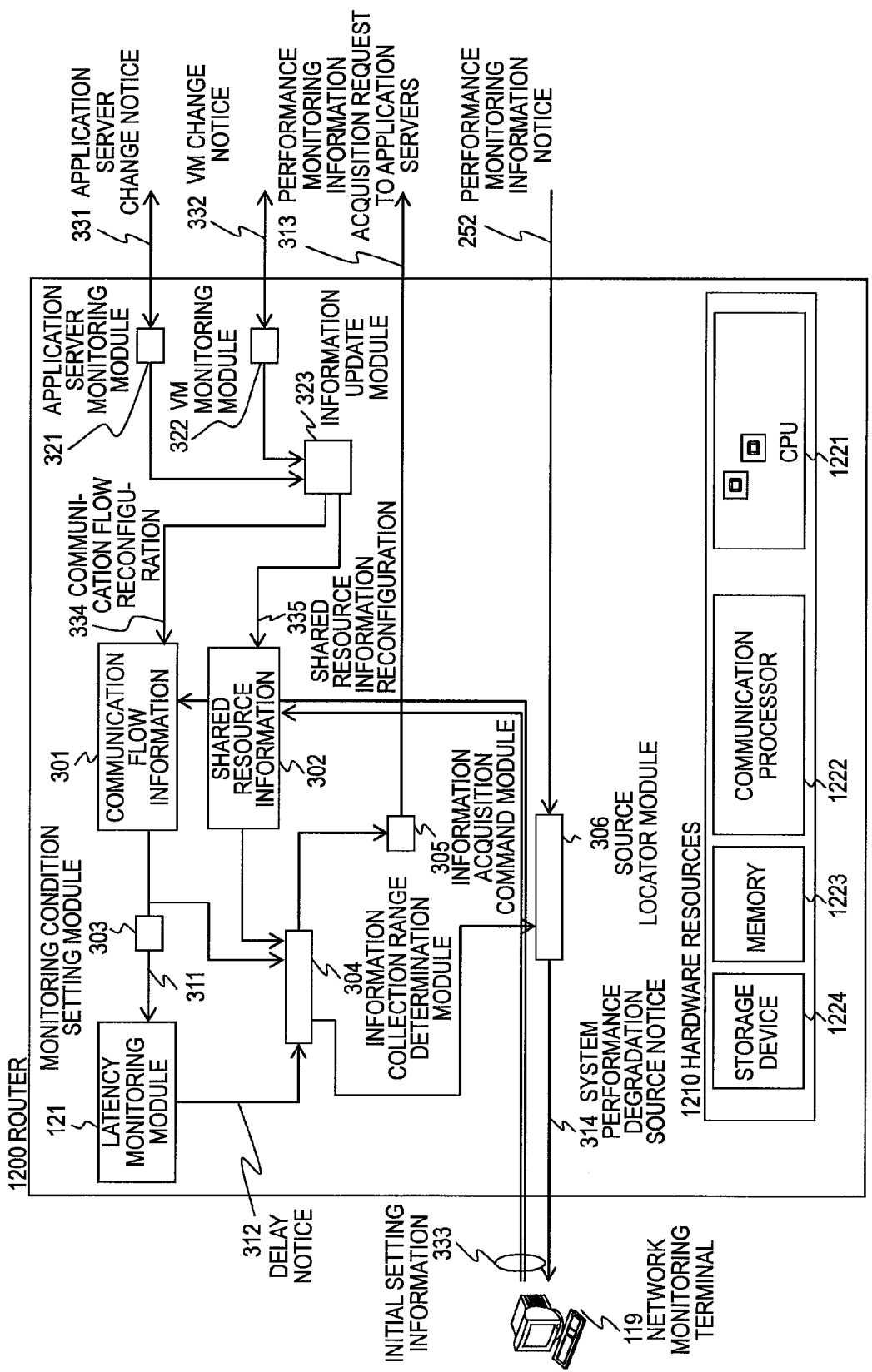
FIG. 12 is a block diagram of a router 1200 to illustrate a third embodiment.

FIG. 12 is a block diagram of a router 1200 to illustrate a third embodiment. The router 1200 in the third embodiment is configured by including the functional components of the network monitoring server 118 shown in FIG. 3 in the first embodiment in the router 120. It can work as a network device equipped with a module for locating the source of performance degradation.

Hardware resources 1210 of the router 1200 include a CPU 1221, a memory 1223, a storage device 1224, and a communication processor 1222 having a plurality of ports.

The latency monitoring module 121 and the functional components of the network monitoring server 118 shown in FIG. 3 in the first embodiment are connected within the router 1200. The same components as those in the first embodiment are denoted by the same reference signs and the repetitive explanations thereof are omitted.

In this third embodiment, like in the first embodiment, the router 1200 monitors the latency in the communications actually using business applications 262 only and locates the parts which have developed an increase in latency (an application server 115x and a virtual machine 212-y) in the data center 110 from the destination IP address 501. Moreover, the router 1200 obtains performance monitoring information on the parts that share physical computer resources (physical computers, virtualization modules 211, and other virtual machines 212) with the suspect virtual machine 212-*y* to locate the part which has caused the increase in latency (performance degraded part).

In the foregoing embodiments, provided are examples in which the routers 102*a* to 102*c*, and 120 monitor the increase in processing latency, but instead of the routers, any network device which can detect an increase in processing latency using destination IP addresses and thresholds TH1 and TH2 may do it. An L3 switch or a load balancer may be used as such a network device.

In the foregoing embodiments, provided are examples in which this invention has been applied to PaaS, but this invention can be applied to SaaS (Software as a Service) or IaaS (Infrastructure as a Service).

In the foregoing embodiments, the time period from the time of receipt of a processing request to the time of transfer upon receipt of its processing response is calculated to be defined as latency, but the time period from the time of receipt of a processing request to the time of receipt of its processing response, or the time period from the time of transfer of a processing request to the time of transfer upon receipt of its processing response may be defined as latency.

In the above embodiments, provided are examples in which both of the routers 102 in the client sites 101 and the router 120 in the data center 110 detect an increase in latency, but only the router 120 in the data center 110 may detect an increase in latency and locate the source of performance degradation in the data center 110.

As set forth above, this invention can be applied to a computer system that provides cloud computing via a WAN and a management method and a management program for cloud computing. This invention can be provided in a form of a device for locating the source of performance degradation in a computer system providing cloud computing.

While the present invention has been described in detail and pictorially in the accompanying drawings, the present invention is not limited to such detail but covers various obvious modifications and equivalent arrangements, which fall within the purview of the appended claims.

What is claimed is:

1. A virtual computer system comprising:
    a network device coupled to a client computer;
    server computers, each coupled to the network device, to provide services to the client computer; and
    a performance degradation source locator apparatus coupled to the network device and the server computers,
    wherein each of the server computers comprises:
        a processor for computing;
        a storage unit for storing information;
        a network interface coupled to the network device;
        a virtualization module for virtualizing physical resources of the server computer; and
        a plurality of virtual machines allowing operating systems and applications for providing the services to run on the virtualized physical resources,
    wherein the network device receives a processing request from the client computer, transfers the processing request to one of the virtual machines, receives a processing response to the processing request from the virtual machine that receives the processing request, and transfers the processing response to the client computer,
    wherein the network device comprises a latency monitoring module that monitors latency between the receipt time of the processing request and the transfer time of the processing response, and sends, to the performance degradation source locater apparatus, a delay notice indicating that the latency has increased, if the latency has exceeded a predetermined threshold value, and
    wherein the performance degradation source locater apparatus comprises:
        communication flow information for setting associations among Internet Protocol (IP) addresses assigned to the virtual machines, identifiers of the server computers, and identifiers of the virtual machines, the communication flow information being a part of information to be transmitted and received by the network device;
        shared resource information for determining computer resources shared by the virtual machines, the computer resources being computer resources of the server computers and computer resources coupled to the server computers;
        a delay locater module that refers to the communication flow information to locate the virtual machine and server computer that has caused the delay, upon receipt of the delay notice from the network device;
        an information collection range determination module that refers to the shared resource information to extract other virtual machines and server computers that share computer resources with the virtual machine that has caused the delay; and
        a source locator module that obtains performance information on physical computer resources and virtual computer resources of the extracted virtual machines and server computers and the virtual machine and server computer that has caused the delay to determine a virtual machine that has caused the delay.

2. The virtual computer system according to claim 1, wherein the client computer and the network device are coupled via a wide area network.

3. The virtual computer system according to claim 2,
    wherein the network device includes:
        a first network device coupled to the server computers and the wide area network; and
        a second network device coupled to the client computer and the wide area network,
    wherein the first network device includes a first latency monitoring module for monitoring the latency from the transfer of the processing request to the transfer of the processing response to the processing request on communications satisfying monitoring conditions set by the performance degradation source locator apparatus and sending the performance degradation source locator apparatus a delay notice indicating that the latency has increased if the latency has exceeded a predetermined first threshold value, and
    wherein the second network device includes a second latency monitoring module for monitoring the latency from the transfer of the processing request to the transfer of the processing response to the processing request on communications satisfying monitoring conditions set by the performance degradation source locator apparatus and sending the performance degradation source locator apparatus a delay notice indicating that the latency has increased if the latency has exceeded a predetermined second threshold value.

4. The virtual computer system according to claim 3, wherein the first network device includes the performance degradation source locator apparatus.

5. The virtual computer system according to claim 1, further comprising a management computer for managing addition or deletion of the server computers, wherein the performance degradation source locator apparatus updates the communication flow information and the shared resource information in accordance with addition or deletion of a server computer when the management computer makes the addition or deletion of the server computer.

6. The virtual computer system according to claim 1, further comprising a management computer for managing addition, deletion, or migration of the virtual machines, wherein the performance degradation source locator apparatus updates the communication flow information and the shared resource information in accordance with the addition, deletion, or migration of the virtual machines when the management computer makes the addition, deletion, or migration of the virtual machines.

7. The virtual computer system according to claim 1,
wherein the virtualization module allocates virtual processors obtained by virtualizing the processor to the virtual machines and allocates virtual network interfaces obtained by virtualizing the network interface to the virtual machines,
wherein the virtualization module comprises:
a processor performance information acquisition module that obtains performance information on the processor as physical processor performance information and obtains performance information on the virtual processors as virtual processor performance information; and
a network interface performance information acquisition module that obtains performance information on the network interface as physical network interface performance information and obtains performance information on the virtual network interfaces as virtual network interface performance information, and
wherein the source locator module obtains performance information on the physical computer resources and performance information on the virtual computer resources from the processor performance information acquisition module and the network interface performance information acquisition module.

8. The virtual computer system according to claim 1, wherein the performance degradation source apparatus sets monitoring conditions for communications, and wherein the monitoring conditions includes an IP address.

9. A method of monitoring a virtual computer system including a network device coupled to a client computer, server computers, each coupled to the network device, to provide services to the client computer, and a performance degradation source locator apparatus coupled to the network device and the server computer, each of the server computers including a processor for computing, a storage unit for storing information, a network interface coupled to the network device, a virtualization module for virtualizing physical resources of the server computer, and a plurality of virtual machines allowing operating systems and applications for providing the services to run on the virtualized physical resources, the method comprising:
a first step of the network device receiving a processing request from the client computer, transferring the processing request to one of the virtual machines, receiving a processing response to the processing request from the virtual machine, transferring the processing response to the client computer, and monitoring latency between the receipt time of the processing request and the transfer time of the processing response;
a second step of transmitting, by the network device, a delay notice indicating that the latency has increased to the performance degradation source locator apparatus, if the latency has exceeded a predetermined threshold;
a third step of referring to, by the performance degradation source locator apparatus, communication flow information that sets associations among the Internet Protocol (IP) addresses assigned to the virtual machines, identifiers of the server computers, and identifiers of the virtual machines, to locate the virtual machine and server computer that has caused the delay, upon receipt of the delay notice from the network device;
a fourth step of referring to, by the performance degradation source locator apparatus, shared resource information that determines computer resources shared by the virtual machines among computer resources of the server computers and computer resources coupled to the server computers, to extract other virtual machines and server computers that share computer resources with the virtual machine that has caused the delay; and
a fifth step of obtaining, by the performance degradation source locator apparatus, performance information on physical computer resources and virtual computer resources of the extracted virtual machines and server computers and the virtual machine and server computer that has caused the delay to determine a virtual machine that has caused the delay.

10. The method of monitoring a virtual computer system according to claim 9, wherein the client computer and the network device are coupled via a wide area network.

11. The method of monitoring a virtual computer system according to claim 10,
wherein the network device includes a first network device coupled to the server computers and the wide area network and a second network device coupled to the client computer and the wide area network, and
wherein the third step includes the steps of:
sending, by the first network device, a delay notice indicating that the latency has increased to the performance degradation source locator apparatus if the latency has exceeded a predetermined first threshold; and
sending, by the second network device, a delay notice indicating that the latency has increased to the performance degradation source locator apparatus if the latency has exceeded a predetermined second threshold.

12. The method of monitoring a virtual computer system according to claim 11, wherein the first network device includes the performance degradation source locator apparatus.

13. The method of monitoring a virtual computer system according to claim 9,
wherein the virtual computer system further includes a management computer for managing addition or deletion of the server computers, and
wherein the method further comprises a step of updating, by the performance degradation source locator apparatus, the communication flow information and the shared resource information in accordance with addition or deletion of the server computers when the management computer makes the addition or deletion of the server computers.

14. The method of monitoring a virtual computer system according to claim 9,
wherein the virtual computer system further includes a management computer for managing addition, deletion, or migration of the virtual machines; and
wherein the method further comprises a step of updating, by the performance degradation source locator apparatus, the communication flow information and the shared resource information in accordance with addition, deletion, or migration of the virtual machines when the management computer makes the addition, deletion, or migration of the virtual machines.

15. The method of monitoring a virtual computer system according to claim 9,
wherein the virtualization module allocates virtual processors obtained by virtualizing the processor to the virtual machines, allocates virtual network interfaces obtained by virtualizing the network interface to the virtual machines, and includes a processor performance information acquisition module that obtains performance information on the processor as physical processor performance information and obtains performance information on the virtual processors as virtual processor performance information and a network interface performance information acquisition module that obtains performance information on the network interface as physical network interface performance information and obtains performance information on the virtual network interfaces as virtual network interface performance information, and
wherein the sixth step obtains, by the performance degradation source locator apparatus, performance information on the physical computer resources and performance information on the virtual computer resources from the processor performance information acquisition module and the network interface performance information acquisition module.

16. The method of monitoring a virtual computer system according to claim 9, wherein the performance degradation source apparatus sets monitoring conditions for communications, and wherein the monitoring conditions includes an IP address.

17. A network device for transmitting and receiving between a client computer and server computers for providing services, each of the server computers include a virtualization module for virtualizing physical resources of the server computers and a plurality of virtual machines allowing operating systems and applications for providing the services on the virtualized physical resources, the network device comprising:
a communication processor for receiving a processing request from the client computer, transferring the processing request to one of the virtual machines, receiving a processing response to the processing request from the virtual machine that receives the processing request, and transferring the processing response to the client computer; and
a latency monitoring module for monitoring latency between the receipt time of the processing request and the transfer time of the processing response, and sending a delay notice, indicating that the latency has increased, to a performance degradation source locator module, if the latency has exceeded a predetermined threshold,
wherein the performance degradation source locator module includes:
communication flow information for setting associations among Internet Protocol (IP) addresses assigned to the virtual machines, identifiers of the server computers, and identifiers of the virtual machines, the communication flow information being a part of information to be transmitted and received by the network device;
shared resource information for determining computer resources shared by the virtual machines, the computer resources being computer resources of the server computers and computer resources coupled to the server computers;
a delay locator module that refers to the communication flow information to locate the virtual machine and server computer that has caused the delay, upon receipt of the delay notice from the latency monitoring module;
an information collection range determination module that refers to the shared resource information to extract other virtual machines and server computers that share computer resources with the virtual machine that has caused the delay; and
a source locator module that obtains performance information on physical computer resources and virtual computer resources of the extracted virtual machines and server computers and the virtual machine and server computer that has caused the delay to determine a virtual machine that has caused the delay.

18. The network device according to claim 17, wherein the performance degradation source apparatus sets monitoring conditions for communications, wherein the monitoring conditions includes an IP address.

* * * * *